US009139985B2

(12) United States Patent
Lum et al.

(10) Patent No.: US 9,139,985 B2
(45) Date of Patent: Sep. 22, 2015

(54) METHOD AND SYSTEM FOR CONTROLLED RELEASE OF HOT WATER FROM A FIXTURE

(75) Inventors: Ken Lum, Fresno, CA (US); Dale Kempf, Manton, CA (US)

(73) Assignee: GRUNDFOS PUMPS CORPORATION, Olathe, KS (US)

( * ) Notice: Subject to any disclaimer, the term of this patent is extended or adjusted under 35 U.S.C. 154(b) by 925 days.

(21) Appl. No.: 12/820,969

(22) Filed: Jun. 22, 2010

(65) Prior Publication Data

US 2010/0300555 A1 Dec. 2, 2010

Related U.S. Application Data

(63) Continuation of application No. 11/875,528, filed on Oct. 19, 2007, now Pat. No. 7,740,182.

(60) Provisional application No. 60/857,556, filed on Nov. 8, 2006.

(51) Int. Cl.
*G05D 23/12* (2006.01)
*E03B 7/04* (2006.01)
*F24D 17/00* (2006.01)

(52) U.S. Cl.
CPC . *E03B 7/04* (2013.01); *E03B 7/045* (2013.01); *F24D 17/00* (2013.01); *Y10T 137/6497* (2015.04); *Y10T 137/7837* (2015.04)

(58) Field of Classification Search
CPC . G05D 23/022; G05D 23/128; G05D 23/185; G05D 23/1393; G05D 23/1346; E03B 7/04; E03B 7/045; E03C 1/014; E03C 1/052; F24D 17/00; F24D 17/0078; F16K 27/12; F16K 15/063; F16K 31/363
USPC ............. 236/2.12, 12.13, 12.14, 12.17, 93 A, 236/93 B, 99 R, 99 J, 99 K, 100; 137/37, 377, 137/563; 251/25, 33, 41
See application file for complete search history.

(56) References Cited

U.S. PATENT DOCUMENTS 2,507,954 A 5/1950 Binnall
2,716,424 A 8/1955 Watts
(Continued)

FOREIGN PATENT DOCUMENTS

DE 29718257 U1 7/1998
DE 19712 9/1998
(Continued)

OTHER PUBLICATIONS

Metlund Systems, 1999, Total 1 pg. Advance Conservation Technology.

(Continued)

*Primary Examiner* — Frantz Jules
*Assistant Examiner* — Azim Abdur Rahim
(74) *Attorney, Agent, or Firm* — Dean D. Small; The Small Patent Law Group, LLC

(57) ABSTRACT

A valve assembly for a water circulation system includes a bypass valve with an inlet and an outlet that permits recirculating flow of water from a hot water line of the water circulation system. The valve assembly also includes a shut-off valve with a valve body having a hot water inlet and a hot water outlet configured to be coupled to a fixture of the water circulation system. The shut-off valve is located proximate the fixture and operating in an open position allowing water to flow to the hot water outlet and a closed position restricting water from flowing to the hot water outlet. The shut-off valve is configured to move automatically from the open position to the closed position in a controlled manner to limit discharge, from the hot water outlet, of water having a temperature below a desired level.

29 Claims, 12 Drawing Sheets

(56) References Cited

U.S. PATENT DOCUMENTS

| | | | |
|---|---|---|---|
| 2,842,155 A | 7/1958 | Peters | |
| 2,823,695 A | 9/1958 | Kool | |
| 3,232,336 A | 2/1966 | Leslie | |
| 3,543,836 A | 12/1970 | Paulson | |
| 2,741,195 A | 6/1973 | Ellis | |
| 3,989,058 A | 11/1976 | Jackson | |
| 4,068,800 A | 1/1978 | Doherty, Jr. | |
| 4,142,515 A | 3/1979 | Skaats | |
| 4,311,272 A | 1/1982 | Föller | |
| 4,331,292 A | 5/1982 | Zimmer | |
| 4,390,157 A * | 6/1983 | Meckstroth | 251/30.02 |
| 4,606,325 A | 8/1986 | Lujan, Jr. | |
| 4,896,658 A | 1/1990 | Yonekubo | |
| 4,917,294 A | 4/1990 | Bergmann et al. | |
| 4,930,551 A | 6/1990 | Haws | |
| 4,945,942 A | 8/1990 | Lund | |
| 5,042,524 A | 8/1991 | Lund | |
| 5,119,988 A | 6/1992 | Fiedrich | |
| 5,135,021 A | 8/1992 | Pegg | |
| 5,183,029 A | 2/1993 | Ranger | |
| 5,205,318 A | 4/1993 | Massaro | |
| 5,209,401 A | 5/1993 | Fiedrich | |
| 5,261,443 A | 11/1993 | Walsh | |
| 5,263,643 A | 11/1993 | Wells et al. | |
| 5,277,219 A | 1/1994 | Lund | |
| 5,287,570 A | 2/1994 | Peterson | |
| 5,323,803 A | 6/1994 | Blumenauer | |
| 5,351,712 A | 10/1994 | Houlihan | |
| 5,385,168 A | 1/1995 | Lund | |
| 5,503,183 A | 4/1996 | Fenn | |
| 5,572,985 A | 11/1996 | Benham | |
| 5,584,316 A | 12/1996 | Lund | |
| 5,586,572 A | 12/1996 | Lund | |
| 5,606,987 A | 3/1997 | Weber | |
| 5,622,203 A * | 4/1997 | Givler et al. | 137/337 |
| 5,623,990 A | 4/1997 | Pirkle | |
| 5,775,372 A | 7/1998 | Houlihan | |
| 5,791,557 A | 8/1998 | Kunze | |
| 5,819,785 A | 10/1998 | Bardini | |
| 5,829,467 A | 11/1998 | Spicher | |
| 5,829,475 A | 11/1998 | Acker | |
| 6,182,683 B1 | 2/2001 | Sisk | |
| 6,250,601 B1 | 6/2001 | Kolar et al. | |
| 6,257,493 B1 | 7/2001 | Chamot et al. | |
| 6,286,464 B1 | 9/2001 | Abraham | |
| 6,536,464 B1 | 3/2003 | Lum | |
| 6,929,187 B2 | 8/2005 | Kempf | |
| 6,962,162 B2 | 11/2005 | Acker | |
| 7,073,528 B2 | 7/2006 | Kempf et al. | |
| 7,104,461 B2 | 9/2006 | Restivo, Sr. et al. | |
| 7,140,382 B2 | 11/2006 | Kempf et al. | |
| 7,178,543 B2 | 2/2007 | Adams | |
| 7,198,059 B2 | 4/2007 | Kempf et al. | |
| 7,221,281 B1 | 5/2007 | Young | |
| 7,287,707 B2 | 10/2007 | Kempf et al. | |
| 7,475,703 B2 | 1/2009 | Kempf et al. | |
| 7,648,078 B2 | 1/2010 | Kempf et al. | |
| 7,740,182 B2 | 6/2010 | Lum et al. | |
| 7,874,498 B2 | 1/2011 | Kempf et al. | |
| 7,971,601 B2 | 7/2011 | Lum et al. | |
| 2002/0046774 A1 * | 4/2002 | Keller | 137/360 |
| 2003/0089399 A1 | 5/2003 | Acker | |
| 2006/0196952 A1 * | 9/2006 | Willsford et al. | 236/12.15 |
| 2008/0271238 A1 | 11/2008 | Reeder et al. | |
| 2009/0145490 A1 | 6/2009 | Kershisnik | |

FOREIGN PATENT DOCUMENTS

| | | |
|---|---|---|
| EP | 0726397 A1 | 8/1996 |
| EP | 1431584 A2 | 6/2004 |
| WO | WO 9843143 | 10/1998 |

OTHER PUBLICATIONS

The Blumenauer Corporation Aqualink, Why Wait for HOT Water?; Apr. 19, 2001; 4 pages, 2004.

The Blumenauer Corporation Aqualink, How it Works; Apr. 19, 2001; 2 pages, 2004.

The Blumenauer Corporation, Aqua-Heat Hot Water recirculating System; 4 pages, 2004.

Laing Autocirc; Undersink Automatic Instant Hot Water Delivery System; Model ACT-303-BTW; 2 pages, 2004.

Laing Autocirc; Model No. ACT-303-BTW; Economic Study; 3 pages, 2004.

Laing; Instant Hot Water Delivery Systems; Autocirc; Questions and Answers; 3 pages, 2004.

Metlund (S-46, S01, and S02) PreFab Systems; S-Series HOT Water D'Mand Systems for Standard Piping(non-recirc) Installation and Operating Instructions; 7 pg, 2004.

Metlund D'Mand Systems; Got Hot Water? 2 pages, 2004.

Jim Dulley, Update Bulletin No. 991, 2001, 4 pages, 2004.

Metlund Systems, Advanced Conservation Tchnology, Inc. 16 pages, 2004.

Medlund Systems, Easy Installation Instructions, 10 pages, 2004.

Medlund Systems, Energy Technology Status Report—E.T.S.R., 11 pages, 2004.

Medlund Systems, Online Ordering, Purchasing Tips, 2 pages, 2004.

Grundfos Hot Water Recirulation Product and Application Guide, 10 pages, 2004.

NIBCO.com Just Right, Hot Water in Seconds!, 10 pages, 2004.

The Chilipepper Hot Water Appliance, How to Get FASTER Hot Water!!!, 22 pages, 2004.

Installation and Operating Instructions for the Chilipepper Appliance, 2 pages, 2004.

* cited by examiner

METHOD AND SYSTEM FOR CONTROLLED RELEASE OF HOT WATER FROM A FIXTURE

CROSS REFERENCE TO RELATED APPLICATIONS

This application is a continuation of U.S. patent application Ser. No. 11/875,528, filed Jun. 6, 2007, titled METHOD AND SYSTEM FOR CONTROLLED RELEASE OF HOT WATER FROM A FIXTURE, which claims the benefit of U.S. Provisional Application No. 60/857,556 filed Nov. 8, 2006, titled METHOD AND SYSTEM FOR CONTROLLED RELEASE OF HOT WATER FROM A FIXTURE, the subject matter of both of which are expressly incorporated herein by reference in their entirety.

BACKGROUND OF THE INVENTION

The subject matter herein relates generally to methods and systems for controlled release of hot water from a fixture, and more particularly, to shut-off valves for controlling the flow of hot water to a fixture.

Home and industrial water distribution systems distribute water to various fixtures, including sinks, bathtubs, showers, dishwashers and washing machines, that are located throughout the house or industrial building. The typical water distribution system brings water in from an external source, such as a city main water line or a private water well, to the internal water distribution piping system. The water from the external source is typically either at a cold or cool temperature. One segment of the piping system takes this incoming cold water and distributes it to the various cold water connections located at the fixtures where it will be used (e.g., the cold water side of the faucet at the kitchen sink). Another segment of the piping system delivers the incoming cold water to a water heater which heats the water to the desired temperature and distributes it to the various hot water connections where it will be used (e.g., the hot water side of the kitchen faucet). At the fixture, cold and hot water either flows through separate hot and cold water control valves that are independently operated to control the temperature of the water into the fixture by controlling the flow rate of water from the separate valves, or the water is mixed at a single valve that selectively controls the desired water temperature flowing from the fixture.

A problem with most home and industrial water distribution systems is that hot water is not always readily available at the hot water side of the fixture when it is desired. This problem is particularly acute in water use fixtures that are located a distance from the hot water heater or in systems with poorly insulated pipes. When the hot water side of these fixtures is left closed for some time, such as overnight, the hot water in the hot water segment of the piping system sits in the pipes and cools. As a result, the temperature of the water between the hot water heater and the fixture lowers until it becomes cold or at least tepid. When opened again, it is not at all uncommon for the hot water side of such a fixture to supply cold water through the hot water valve when it is first opened and for some time thereafter. At the sink, bathtub or shower fixture located away from the water heater, the person desiring to use the fixture will either have to use cold or tepid water instead of hot water or wait for the distribution system to supply hot water through the open hot water valve. Most users have learned that to obtain the desired hot water, the hot water valve must be opened and left open for some time so that the cool water in the hot water side of the piping system will flow out ahead of the hot water. For certain fixtures, such as virtually all dishwashers and washing machines (which are not usually provided with a bypass valve), there typically is no method of "draining" away the cold or tepid water in the hot water pipes prior to utilizing the water in the fixture.

The inability to have hot water at the hot water side of the fixture when it is desired creates a number of problems. One problem is having to utilize cold or tepid water when hot water is desired. This is a particular problem for the dishwasher and washing machine fixtures in that hot water is often desired for improved operation of those appliances. Certain dirty dishes and clothes are much easier to clean in hot water as opposed to cold or tepid water. Even in those fixtures where the person can let the cold or tepid water flow out of the fixture until it reaches the desired warm or hot temperature, there are certain problems associated with such a solution. One such problem is the waste of water that flows out of the fixture through the drain and, typically, to the sewage system. This good and clean water is wasted (resulting in unnecessary water treatment after flowing through the sewage system). Water waste is compounded when the person is inattentive and hot water begins flowing down the drain and to the sewage system. Yet another problem associated with the inability to have hot water at the hot water valve when needed is the waste of time for the person who must wait for the water to reach the desired temperature.

The use of bypass valves and/or water recirculation systems in home or industrial water distribution systems to overcome the problems described above have been known for some time. However, these water recirculation systems have problems and limitations. For example, these water recirculation systems are typically operated by a pump and the pump must be operated for a certain cycle time to dispel all of the cooled water from the hot water pipe system before hot water is available at the fixture. Problems arise when hot water is desired at the fixture before the end of a cycle, or when the pump is not running. However, constantly running the pump so that hot water is always available is not economical. Accordingly, the above mentioned problems (e.g. waste of water) are still prevalent in water recirculation systems today.

BRIEF DESCRIPTION OF THE INVENTION

In one embodiment, a valve assembly is provided for a water circulation system that includes a bypass valve with an inlet and an outlet that permits recirculating flow of water from a hot water line of the water circulation system. The valve assembly also includes a shut-off valve with a valve body having a hot water inlet and a hot water outlet configured to be coupled to a fixture of the water circulation system. The shut-off valve is located proximate the fixture and operating in an open position allowing water to flow to the hot water outlet and a closed position restricting water from flowing to the hot water outlet. The shut-off valve is configured to move automatically from the open position to the closed position in a controlled manner to limit discharge, from the hot water outlet, of water having a temperature below a desired level.

Optionally, the shut-off valve may be movable between the open and closed positions based on a shut-off condition, wherein the shut-off condition is based on at least one of a temperature of the water, a pressure of the water, a flow rate of the water, a flow volume of the water. The shut-off valve may include a movable shuttle received within the valve body, wherein the movable shuttle permits and restricts water flow to the hot water outlet based on a position of the shuttle. Optionally, the movable shuttle may have an inner chamber, wherein the shuttle is movable between an open and a closed position based on a pressure differential of the water within the inner chamber and external to the inner chamber. Optionally, the shuttle may be movable between an open and a closed position based on a pressure of the water, and the bypass valve may be configured to control the pressure of the water by permitting and restricting flow of water therethrough. The bypass valve may be movable between the open and closed positions based on a bypass condition.

In another embodiment, a valve assembly is provided for a water circulation system, wherein the valve assembly includes a housing configured to be located proximate a fixture of the water circulation system. A bypass valve is received within the housing, wherein the bypass valve has a bypass passage and a flow control unit movable between an open position and a closed position, wherein the flow control unit is configured to restrict water flow through the bypass passage in the closed position based on a bypass condition. A shut-off valve is also received within the housing, wherein the shut-off valve has a hot water inlet and a hot water outlet configured to supply water to the fixture. The shut-off valve operates in an open position allowing water to flow to the hot water outlet and a closed position restricting water from flowing to the hot water outlet, and the shut-off valve is configured to move from the open position to the closed position in a controlled manner to limit discharge, from the hot water outlet, of water having a temperature below a desired level.

In a further embodiment, a water control fixture is provided that includes a housing having a plurality of ports defining a hot water inlet port, and a fixture outlet port, wherein water is dispensed via the fixture outlet port. At least one handle is attached to the housing for controlling the flow of water from the hot water inlet port to the fixture outlet port. A valve assembly is disposed in the housing, wherein the valve assembly has a shut-off valve received within the housing. The shut-off valve has a hot water inlet in flow communication with the hot water inlet port and a hot water outlet in flow communication with the fixture outlet port, and the shut-off valve operates in an open position allowing water to flow to the hot water outlet and a closed position restricting water from flowing to the hot water outlet. The shut-off valve is configured to move from the open position to the closed position in a controlled manner to limit discharge, from the hot water outlet, of water having a temperature below a desired level.

DETAILED DESCRIPTION OF THE INVENTION

Figure 1:
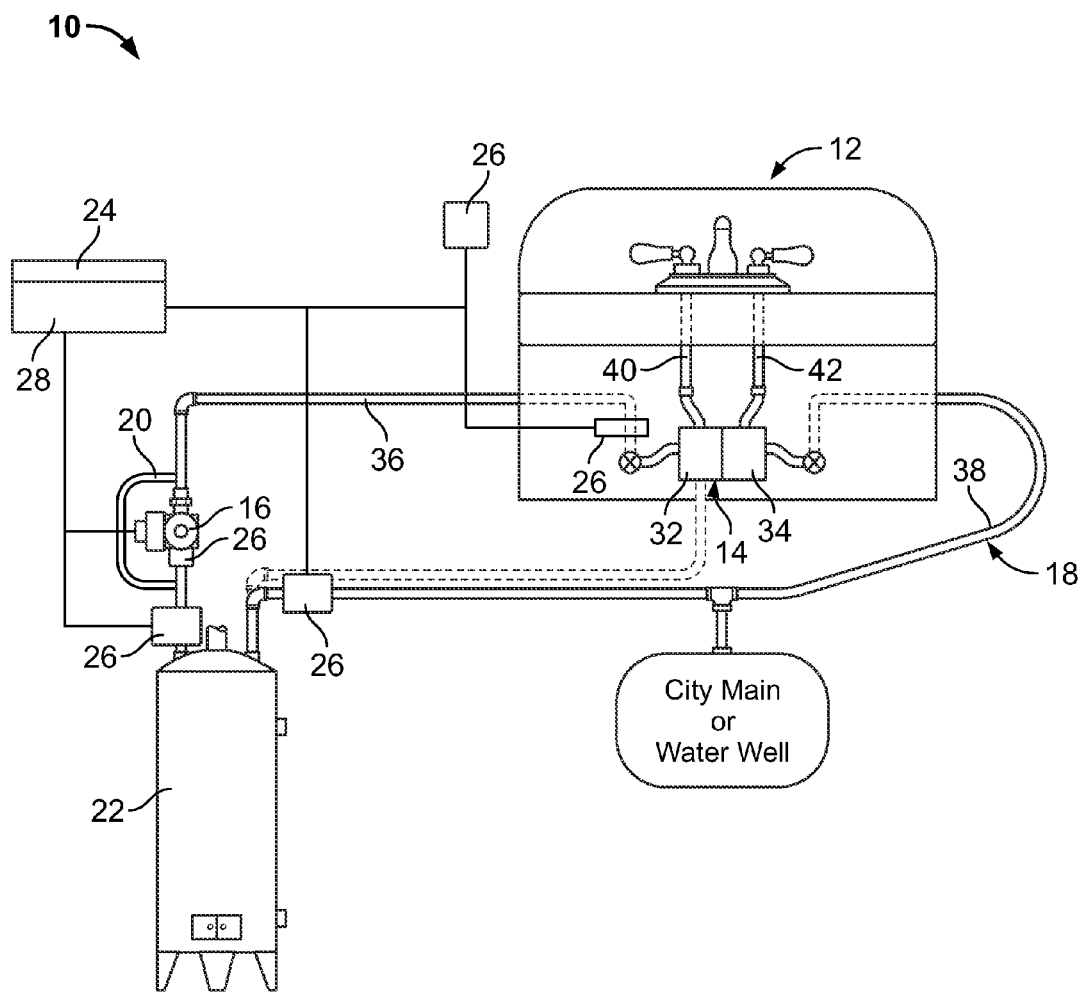
FIG. 1 is a side elevation view showing a water circulation system and fixture utilizing a valve assembly in accordance with an exemplary embodiment.

FIG. 1 is a side elevation view showing a water circulation system 10 and fixture 12 utilizing a valve assembly 14 in accordance with an exemplary embodiment. In order to achieve the desired circulation flow, a single circulating pump 16 is utilized as part of a piping system 18 of the water circulating system 10. The pump 16 may be a single, small pump of the type used in residential hot water space heating. To avoid reduced flow, a check valve 20 can be plumbed in parallel with the pump 16 or incorporated within the pump housing, to pass a flow rate exceeding the pump's capacity around the pump 16. When the pump 16 is powered and flow demand is low, the check valve 20 prevents the boosted flow from re-circulating back to its own inlet.

In the illustrated embodiment, the pump 16 is located at or near a water heater 22 in the discharge piping or hot water piping. While a conventional home water heater is illustrated in FIG. 1, it is realized that other types of water heaters may be used, such as a tankless water heater. When operated, the pump 16 boosts the pressure in the hot water piping somewhat above that in the cold water pipes (e.g., perhaps one to three feet of boost) causing a pressure differential in the hot water piping. With this arrangement only one pump 16 per plumbing system (e.g., per water heater) is required with any reasonable number of remote faucet sets (e.g., the typical number used in residences) equipped with bypass valves 10. In alternative embodiments, the pump 16 may be located in other pump locations, such as in the hot water piping near the fixture 12, at the fixture 12, in the supply piping near the water heater 22, or the like.

In one embodiment, the pump 16 may operate twenty-four hours a day, with most of the time in the no flow mode. However, this is unnecessary and wasteful of electricity. Alternatively, the pump 16 can have a timer 24 to turn on the pump 16 daily at one or more times during the day just before those occasions when hot water is usually needed the most (e.g., for morning showers, evening cooking, etc.) and be set to operate continuously for the period during which hot water is usually desired. This still could be unnecessary and wasteful of electricity. Another alternative is to have the timer 24 cycle the pump 16 on and off regularly during the period when hot water is in most demand. The "on" cycles should be of sufficient duration to bring hot water to all remote fixtures 12, and the "off" period would be set to approximate the usual time it takes the water in the lines to cool-down to minimum acceptable temperature. By using a time-of-day control timer 24, the pump 16 operates to maintain "instant hot water" only during periods of the day when hot water is commonly desired. During the off-cycle times, the plumbing system operates just as if the pump 16 were not in place. This saves electrical power usage from pump operation and, more importantly, avoids the periodic introduction of hot water into relatively uninsulated pipes during the off-hours, thereby saving the cost of repeatedly reheating this water. The time-of-day control also avoids considerable wear and tear on the pump 16. Considerable additional benefits are gained by using a cyclic timer 24, with or without the time-of-day control.

Optionally, a sensor 26 may be provided within the water circulation system 10 to detect flow characteristics of water within the water circulation system 10, such as in the supply pipes. The sensor 26 may be used with or without the timer 24 to control the operation of the pump 16. The sensor 26 may be located at the pump 16 or the sensor 26 may be located elsewhere in the system, such as at the fixture, at the cold water pipe, at the hot water pipe, at the water heater 22, and the like. The sensor 26 may be sized to detect significant flows only (e.g., those flows that are much larger than flows through the valve assembly 14), such as a shower flowing. Optionally, the sensor 26 may constitute a flow sensor that operates to detect a flow characteristic of actual flow of water through the pipes or through the pump 16. The sensor 26 may also be coupled with an electrical switch, such as a reed switch, for controlling a component within the water circulation system 10, such as the pump 16, a valve, and the like. Optionally, the sensor 26 may be, or may include, a transducer.

In an alternative embodiment, the sensor 26 may constitute a pressure sensor that operates to detect a flow characteristic of either a pressure value at a particular point within the water circulation system 10, or a change in pressure within the water circulation system 10 to detect flow. Alternatively, the sensor 26 may constitute a temperature sensor that operates to detect a flow characteristic of temperature, such as a temperature value or a change in temperature to detect flow of water through the water circulation system 10. Alternatively, the sensor 26 may constitute a manually activated switch, a push button switch, a motion detector, a photo-detector, a noise detector, an infrared sensor, a door sensor, a floor pressure sensor, or an appliance activation sensor for activating the pump 16.

The sensor 26 may be located proximate (e.g. at or near) the supply pipes, proximate the return pipes, proximate the pump 16, proximate the water heater 22, proximate the valve assembly 14, proximate the fixture 12, within the same room as the fixture 12, within the piping system, or elsewhere within the building housing the water circulation system 10. In the illustrated embodiment, the system 10 includes a first sensor 26 (e.g. a flow sensor) near the water heater 22, attached to the hot water supply pipe, a second sensor 26 (e.g. a manually activated sensor) within the room having the fixture 12, and a third sensor 26 (e.g. a temperature sensor) in the return pipe near the water heater 22. The return pipe may be a dedicated return pipe from the fixture or may be the cold water supply pipe, through which recirculation flow is permitted. The location of the switches 26 depends upon factors such as the type of sensor 26, the type of system 10, the preference of the user, new or existing construction of the building, and the like.

The sensor 26 may communicate with a controller 28, which in turn communicates with the pump 16. The communication may be wired or wireless. The controller 28 may be separately provided from the pump 16 and the sensor 26, or alternatively, may be integral with the pump 16 and/or the sensor 26. In another alternative embodiment, the sensor 26 may communicate directly with the pump 16. The timer 24 may also communicate with the controller 28, and may be integral with the controller 28. In one embodiment, when the cyclic timer 24 is used, the sensor 26 may be wired in series with the pump motor, and the sensor 26 may prevent the motor from cycling if an existing flow is detected at the moment the timer calls for pump on. The use of such a sensor 26 accomplishes several useful objectives, including reducing electrical power usage and extending pump life if hot water is already flowing and there is no need for the pump to operate, avoiding a sudden temperature rise and the likelihood of scalding that could result from the pump boost if water is being drawn from a "mixing" valve (such as a shower or single handle faucet) and allowing use of a "large" pump (now that the danger of scalding is eliminated) with its desirable low pressure drop at high faucet flows, thereby eliminating the need for the parallel check valve 20 required with a "small" pump.

In alternative embodiments, the water circulation system 10 may also include at least one temperature sensor coupled to the pipes of the water circulation system 10 for providing temperature feedback to the pump 16. For example, the sensor 26 may be placed proximate and/or downstream of the most remote fixture within the water circulation system 10. The sensor 26 may be placed near the water heater 22 in a dedicated return pipe or the cold water return pipe. The operation of the pump 16 may be controlled by the temperature sensor, such as by turning the pump 16 on when the temperature of the water reaches a predetermined threshold, or alternatively, falls by a predetermined amount or at a predetermined rate. Similarly, the pump 16 may be turned off when the temperature of the water reaches a predetermined threshold, or alternatively, rises by a predetermined amount or at a predetermined rate. In another alternative embodiment, the pump 16 may be controlled based on the flow of water within the water circulation system 10. For example, by using the sensor 26 as a flow detector (e.g. a flow sensor, a pressure sensor, a temperature sensor, and the like), the operation of the pump 16 may be controlled based on flow characteristics of the water in the water circulation system 10. For example, when a user demands hot water, such as by turning on the faucet, the flow of water through the pipes and/or the pump may be detected and the pump 16 may be turned on. Other demand-type sensors may be provided to turn the pump on, such as pressing a manual switch, or by activating another type of sensor such as an IR sensor.

The valve assembly 14 includes a shut-off valve portion 32 and a bypass valve portion 34, which are both schematically illustrated in FIG. 1. The bypass valve portion 34 includes a bypass control unit for controlling the flow of water through the bypass valve portion 34. In an exemplary embodiment, the valve assembly 14 is connected between a hot water supply line 36 and a cold water supply line 38. The valve assembly 14 interconnects the supply lines 36 and 38 such that a flow path is created therebetween. Cooled water from the hot supply line 36 is directed through the valve assembly 14 into the cold supply line 38 and ultimately back to the water heater 22. The valve assembly 14 is also connected to fixture supply lines 40 and 42 that supply hot and cold water, respectively to the fixture 12. In one embodiment, the shut-off portion 32 is connected to the hot supply lines 36, 40 and the bypass valve portion 34 is connected to the cold supply lines 38, 42. In alternative embodiments, other connection configurations may be provided. For example, a single fixture supply line may be provided, the shut-off valve portion 32 may be connected to at least one of the cold supply lines 38, 42, the bypass valve portion 34 may be connected to at least one of the hot supply lines 36, 40, and the like. Additionally, the valve assembly 14 may be connected to a dedicated return line (shown in phantom in FIG. 1) that is connected to the water heater 22, as opposed to the cold supply line 38. In one embodiment, the portions 32, 34 of the valve assembly 14 may be formed from a single integral body. Alternatively, the portions 32, 34 may be separately fabricated and coupled to one another. In another alternative embodiment, an interconnection may be provided between the portions 32, 34, such as a flexible pipe or other pipe or conduit such that the portions 32, 34 may be positioned in different locations. In yet another alternative embodiment, the valve body 32 may be integrated with the fixture 12, and may be received within the housing of the fixture 12, attached to the fixture 12, or mounted proximate the fixture 12.

In alternative embodiments, other connection configurations may be provided. For example, a single fixture supply line may be provided, wherein mixing of the hot and cold water occurs within the valve body 32. Additionally, the valve assembly 14 may be connected to a dedicated return line (shown in phantom in FIG. 1) that is connected to the water heater 22, wherein hot water recirculation is permitted through the dedicated return line as opposed to the cold supply line 38. In such an embodiment, the hot and cold supply lines 36, 38 may or may not be in fluid communication with one another, depending on the particular application. In one embodiment utilizing the dedicated return line, the valve assembly 14 may not be connected to either the cold water supply line 38 or the cold water fixture supply line 42. Rather, the valve assembly 14 is connected to the hot water supply line 36, the hot water fixture supply line 40, and the dedicated return line.

Figure 2:
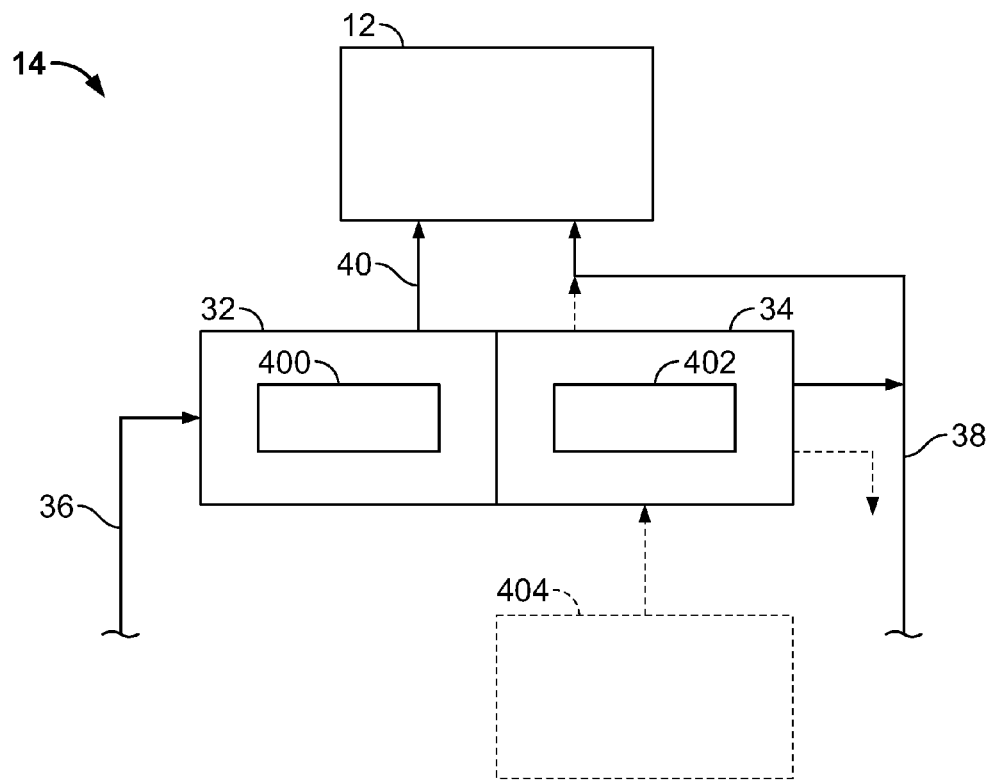
FIG. 2 schematically illustrates an exemplary embodiment of the valve assembly.

FIG. 2 schematically illustrates an exemplary embodiment of the valve assembly 14, including the shut-off valve portion 32 and the bypass valve portion 34. The portions 32 and 34 are integrated into a common housing such that the portions 32 and 34 define a single unit. The valve assembly 14 is positioned proximate the fixture 12.

The shut-off valve portion 32 has a hot water inlet configured to receive water from the hot water supply line 36 and a hot water outlet configured to supply water to the fixture 12, such as through the fixture supply line 40. The shut-off valve portion 32 includes a flow control unit 400 operating in an open position allowing water to flow to the hot water outlet and a closed position restricting water from flowing to the hot water outlet. Water flow to the hot water outlet may be permitted or restricted based on a position of the flow control unit 400. The flow control unit 400 may be movable from a closed position to an open position in a controlled manner to limit discharge of water having a temperature below a desired level. For example, the flow control unit 400 may limit flow to the hot water outlet until the water is at a desired level. The flow control unit 400 thus limits the amount of tepid water that is discharged from the hot water outlet. Tepid water may be defined as water that is below a desired hot temperature level.

In an exemplary embodiment, the flow control unit 400 of the shut-off valve portion 32 is movable between the open and closed positions based on a shut-off condition. The shut-off condition may be based on at least one of a temperature of the water, a pressure of the water, a flow rate of the water, a flow volume of the water. The temperature, pressure, flow rate or flow volume may be an absolute amount or a gradient or rate of change in amount of the respective characteristic, for example, a temperature of 97 degrees or a temperature change of 3 degrees, or a rate of change of 3 degrees per unit time. The flow control unit 400 may be operated mechanically, such as by an actuator or bias mechanism, or the flow control unit 400 may be operated electrically, such as by a solenoid. In an exemplary embodiment, the flow control unit 400 is movable between an open and a closed position based on a pressure of the water in the shut-off valve portion 32, and the bypass valve portion 34 is used to control the pressure of the water by permitting and restricting flow of water therethrough.

The bypass valve portion 34 has a bypass passage therethrough and a flow control unit 402 positioned for controlling flow through the bypass passage. The flow control unit 402 may be movable between an open position and a closed position, wherein the flow control unit 402 restricts water flow through the bypass passage in the closed position and permits water flow through the bypass passage in the open position. The bypass valve portion 34 permits recirculating flow from the hot water supply line 36 back to the hot water heater 22 (shown in FIG. 1). In an exemplary embodiment, the bypass valve portion 34 receives water from the hot water supply line 36 through the shut-off valve portion 32 (e.g. water flows through the shut-off valve portion 32 directly into the bypass valve portion 34). The bypass valve portion 34 discharges recirculated water into the cold water supply line 38. In an alternative embodiment, the bypass valve portion 34 discharges recirculated water into a dedicated return line, such as illustrated by the phantom line in FIG. 2, as opposed to the cold water supply line 38. In one embodiment, the cold water supply line 38 is directly coupled to the fixture 12, however, in some embodiments, the cold water may be supplied to the fixture 12 through the bypass valve portion 34, such as illustrated by the phantom line in FIG. 2.

In an exemplary embodiment, the flow control unit 402 of the bypass valve portion 34 is movable between the open and closed positions based on a bypass condition. The bypass condition may be based on at least one of a temperature of the water, a pressure of the water, a flow rate of the water, a flow volume of the water. The flow control unit 402 may be operated mechanically, such as by an actuator or bias mechanism, or the flow control unit 402 may be operated electrically, such as by a solenoid. Optionally, when the flow control unit 402 is electrically operated between open and closed positions, the operation may be based on an activation signal for an activation source 404. The activation signal may be responsive to a water characteristic, a timer, a manually activated switch, a push button switch, a motion detector, a photo-detector, a noise detector, an infrared sensor, a door sensor, a floor pressure sensor, or an appliance activation sensor.

Figure 3:
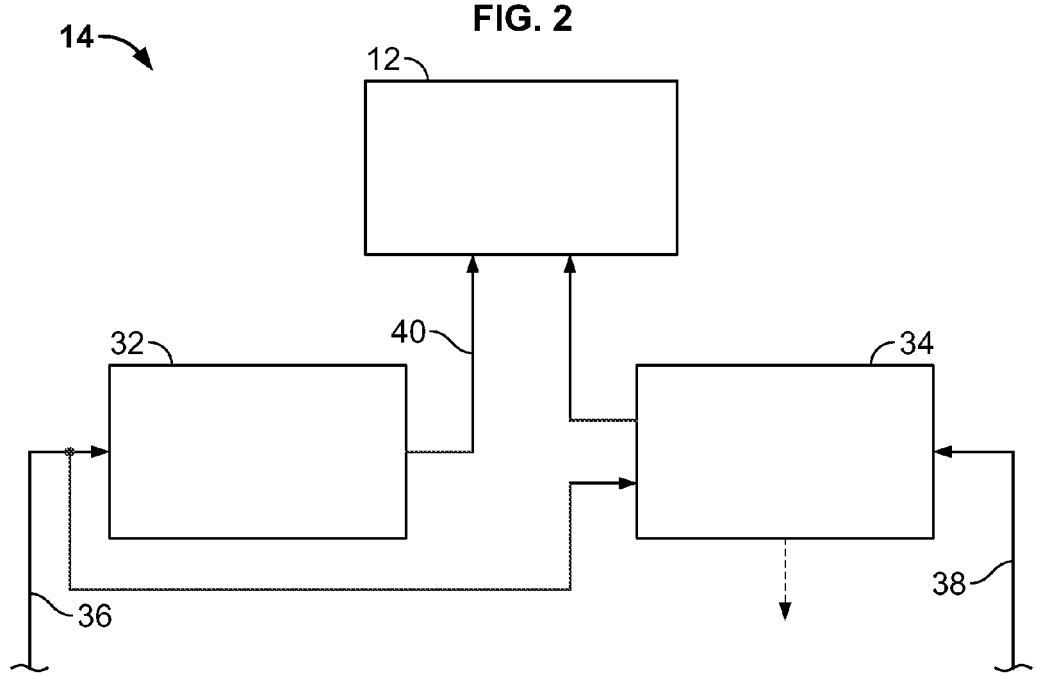
FIG. 3 schematically illustrates another exemplary embodiment of the valve assembly.

FIG. 3 schematically illustrates another exemplary embodiment of the valve assembly 14, including the shut-off valve portion 32 and the bypass valve portion 34. The portions 32 and 34 are separately provided from one another and positioned proximate one another and proximate the fixture 12. The portions 32, 34 may be individually plumbed into the water circulation system.

The shut-of valve portion 32 has a hot water inlet configured to receive water from the hot water supply line 36 and a hot water outlet configured to supply water to the fixture 12, such as through the fixture supply line 40. The bypass valve portion 34 has a hot water inlet configured to receive water directly from the hot water supply line 36, as opposed to receiving water through the shut-off valve portion 32 as described with respect to the embodiment of FIG. 2. The bypass valve portion 34 discharges recirculated water into the cold water supply line 38. In an alternative embodiment, the bypass valve portion 34 discharges recirculated water into a dedicated return line, such as illustrated by the phantom line in FIG. 3.

Figure 4:
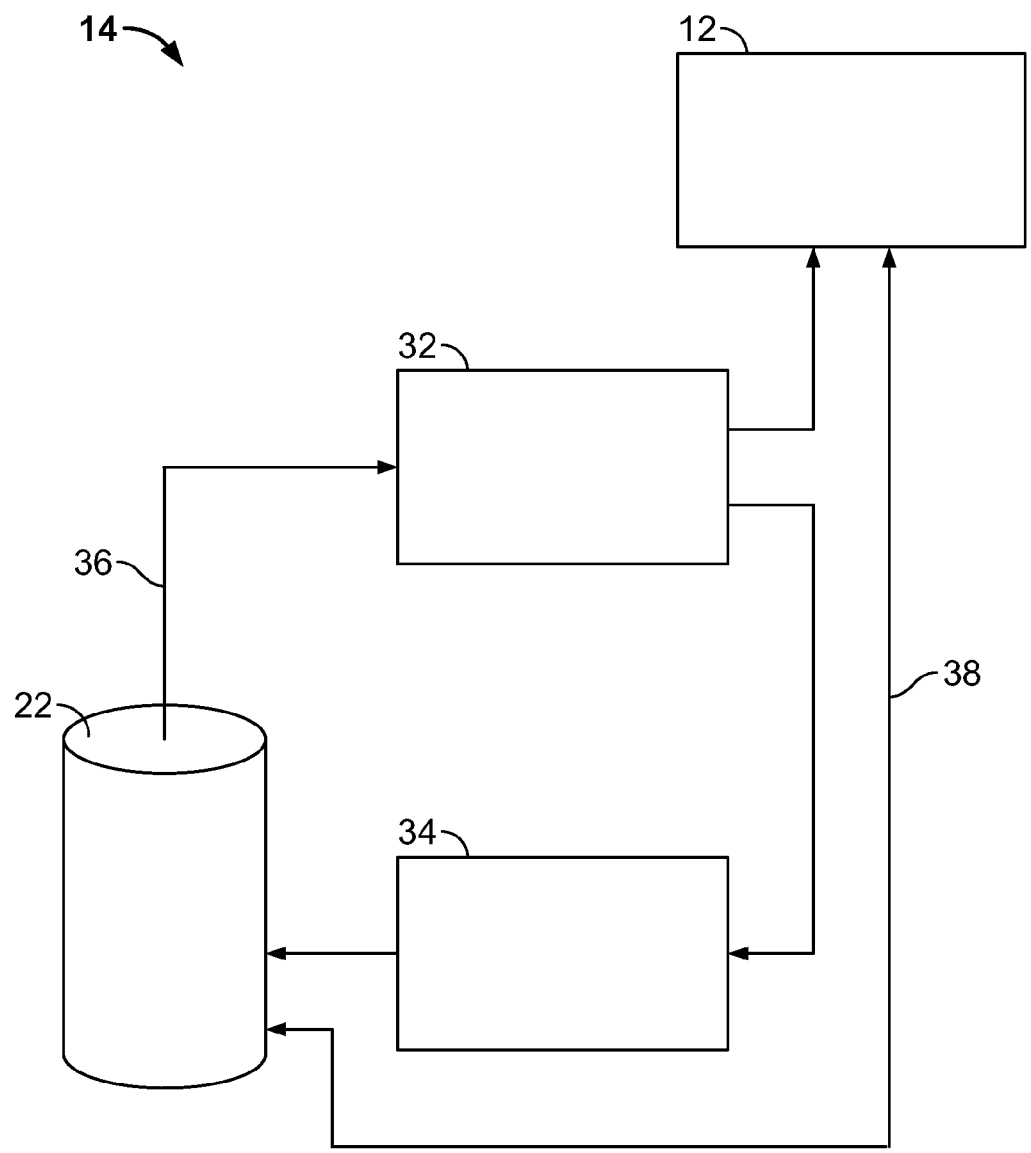
FIG. 4 schematically illustrates a further exemplary embodiment of the valve assembly.

FIG. 4 schematically illustrates a further exemplary embodiment of the valve assembly 14, including the shut-off valve portion 32 and the bypass valve portion 34. The portions 32 and 34 are separately provided from one another. The shut-off valve portion 32 is positioned proximate the fixture 12, and the bypass valve portion 34 is positioned remote from both the shut-off valve portion 32 and the fixture 12. In the illustrated embodiment, the bypass valve portion 34 is positioned proximate the water heater 22.

The shut-of valve portion 32 has a hot water inlet configured to receive water from the hot water supply line 36 and a hot water outlet configured to supply water to the fixture 12, such as through the fixture supply line 40. The cold water supply line 38 is directly coupled to the fixture 12 and to the water heater 22. The bypass valve portion 34 has a hot water inlet configured to receive water from the shut-off valve portion 32. In an exemplary embodiment, when the bypass valve portion 34 is closed and stops water flow therethrough, the operation of the shut-off valve portion 32 may be controlled, such as by controlling the pressure of the water in the shut-off valve portion 32.

Figure 5:
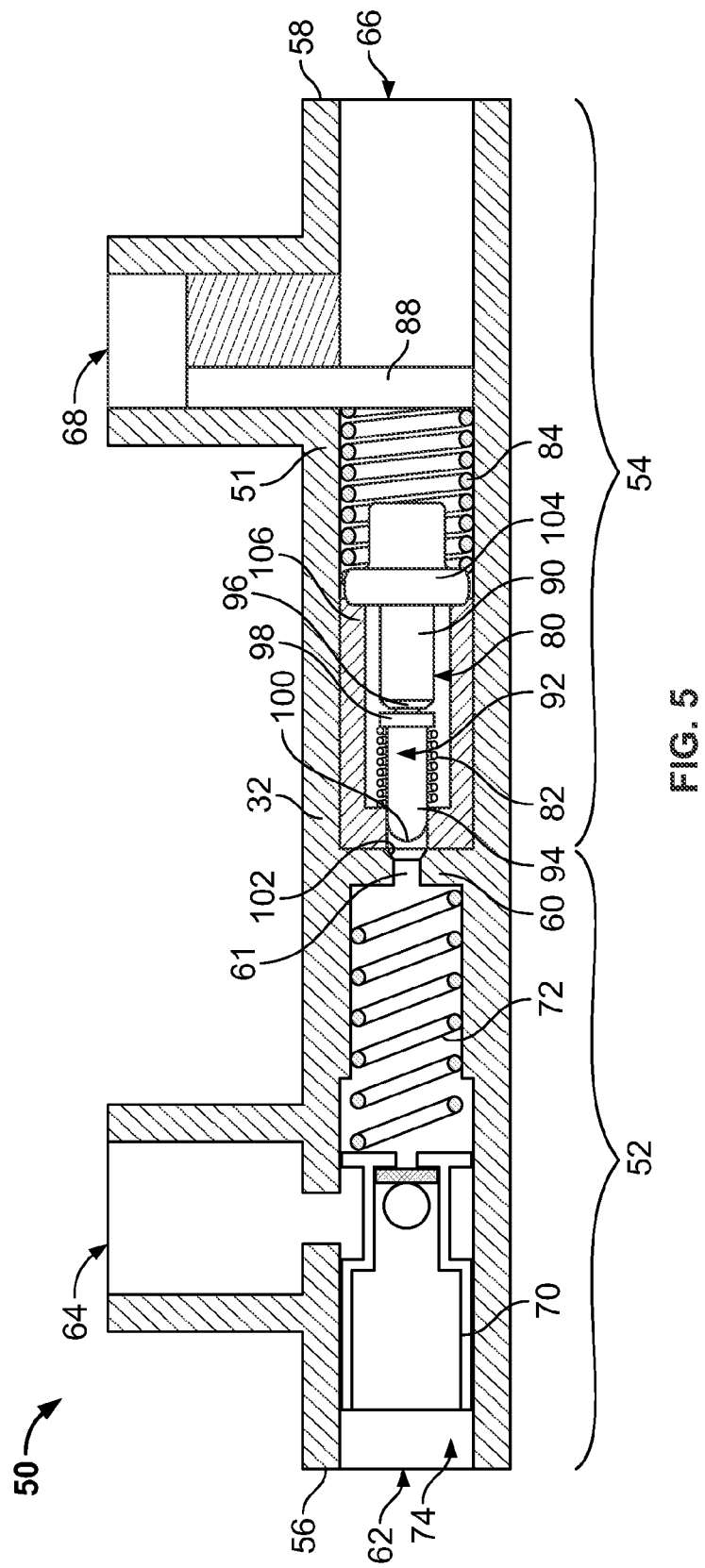
FIG. 5 is a side elevation view of an exemplary valve assembly for use with the water circulation system and fixture shown in FIG. 1 with a portion of a body of the valve assembly cutaway to illustrate the various components of the valve assembly.

FIG. 5 is a side elevation view of an exemplary valve assembly 50 with a portion of a body 51 of the valve assembly 50 cutaway to illustrate the various components of the valve assembly 50. The valve assembly 50 could be used in place of the valve assembly 14 (shown in FIG. 1). The valve assembly 50 includes a shut-off valve portion 52 and a bypass valve portion 54 both housed within the body 51. The body 51 is a single, unitary member having a first end 56, a second end 58 and a separating wall 60 disposed between the first end 56 and the second end 58. In the illustrated embodiment, the separating wall 60 includes a passage 61 therein. The passage 61 interconnects the first end 56 and the second end 58 and allows fluid to flow therethrough. In one embodiment, the valve body 51 is manufactured out of a molded plastic material having relatively high strength and chemical/corrosion resistant characteristics. The molded plastic material provides the ability to manufacture the valve body 51 utilizing injection molding processes with the design based on the configuration described herein without the need for expensive casting or machining. Alternatively, the valve body 51 can be manufactured from various plastics, reinforced plastics or metals that are suitable for "soft" plumbing loads and resistant to hot chlorinated water under pressure.

The valve body 51 has four threaded ports, an axial and radial port at the first end 56 and an axial and radial port at the second end 58. The first end 56 is designated to receive and discharge hot water and the second end 58 is designated to receive and discharge cold water from a source of cold water, such as a city water supply system or a local water well. In the illustrated embodiment, the shut-off valve portion 52 is provided at the first end 56 and the bypass valve portion 54 is provided at the second end 58, and the separating wall 60 separates the shut-off valve portion 52 from the bypass valve portion 54. While other configurations are possible in alternative embodiments, in the illustrated embodiment, the axial ports are designated as inlet ports and the radial ports are designated as discharge ports. For example, at the first end 56 (the hot water side) is a first inlet port 62 and a first discharge port 64 and at the second end 58 (the cold water side) is a second inlet port 66 and second discharge port 68. Conversely, the radial ports can be the inlet ports and the axial ports can be the discharge ports, or a combination thereof. Additionally, more or less ports may be provided, such as a single discharge port or a dedicated return port, and the like. As discussed in detail below, the first and second inlet ports 62, 66 connect to the hot and cold water distribution system and the first and second discharge ports 64, 68 connect to the hot and cold water valves on the fixture (e.g., sink, shower, bathtub or etc.) with which the valve assembly 50 is utilized.

The shut-off valve portion 52 includes a shuttle 70 and a return spring 72. The shuttle 70 is movably received within a chamber 74 of the body 51. The return spring 72 is positioned between the shuttle 70 and the separating wall 60 and provides a return force on the shuttle 70 to maintain a position of the shuttle 70 at certain times. As described in further detail below, the shuttle 70 is movable between an open position and a closed position. In the open position, such as the position illustrated in FIG. 5, water is allowed to flow through the first discharge port 64. In the closed position, the shuttle 70 blocks water from flowing through the first discharge port 64. In one embodiment, and as will be explained in further detail below, the shuttle 70 is movable based on a pressure of the water in the shut-off valve portion 52. For example, a pressure difference of the water may overcome the return force of the return spring 72 and cause the shuttle 70 to move to the closed position. Similarly, when the pressure differential across the shuttle 70 of the water in the shut-off valve portion 52 is below a certain amount, the return spring 72 may return the shuttle 70 to the open position. For example, when the pump 16 is activated, a pressure differential may be created in the hot water supply pipe, and thus at the first inlet port 62. The valve body 51 is designed so the components can fit through either of the inlet and/or discharge ports, such as with a snap-in fit. In this manner, no intermediate or additional joints are required for installation.

In an exemplary embodiment, the bypass valve portion 34 of the valve body 32 includes a flow control unit for controlling the flow of water through the bypass valve portion 34. In the illustrated embodiment, the flow control unit is represented by a thermally sensitive actuating element 80. However, in alternative embodiments, other types of devices may be used to control flow through the bypass portion. For example, the device may be electrically actuated, hydraulically actuated, pneumatically actuated, and the like. The flow control unit may be thermally actuated, such as the actuating element 80 or other types of thermally actuated devices, or the flow control unit may be actuated in response to other types of stimuli, such as pressure, flow, manual activation, and the like.

In the illustrated embodiment, the valve body 32 houses the thermally sensitive actuating element 80 in addition to a bias spring 82, an over-travel spring 84 and a retaining pin 88. The thermally sensitive actuating element 80 may be of the wax filled cartridge type, also referred to as wax motors, having an actuator body 90 and an integral piston/poppet rod member 92. The rod member 92 includes a poppet 94 attached to a piston 96 with an intermediate flange 98 thereon. An end 100 of the poppet 94 seals a valve seat 102 at the separating wall 60 to close the passage 61. Optionally, the poppet 94 may seat against the valve seat 102 to seal the valve seat 102. Additionally, the poppet 94 may at least partially enter opening of the passage 61 in some embodiments. By entering the opening, the need for the over-travel spring 84 may be negated. The actuator body 90 has a section 104 of increased diameter to seat against a shoulder 106 in the valve body 51. The over-travel spring 84 abuts against one side of the section 104 and the opposed side of the section 104 abuts against the shoulder 106. The piston 96 of the rod member 92 interconnects the poppet 94 with the actuator body 90. In alternative embodiments, other types of actuating elements/bypass valves may be utilized rather than a thermally sensitive actuating element. In alternative embodiments, other types of actuating elements 80 may be provided, such as a spool or other type of valve.

In operation, the actuating element 80 is movable between an open position, as illustrated in FIG. 5, and a closed position. In the open position, water is allowed to flow through the passage 61 from the shut-off valve portion 52 to the bypass valve portion 54. As such, water flows from the hot side to the cold side of the valve assembly 50. In this way, the cooled water may be dispelled from the hot water lines, thus bringing hot water to the hot side of the valve assembly 50 for dispensing at the fixture. In the closed position, the poppet end 100 seats against the valve seat 102 and water is restricted from flowing through the passage 61. As will be explained in further detail below, when the actuating element 80 is closed, the pressure upstream of the actuating element 80 (e.g. in the shut-off valve portion 52) may be affected, such as by equalizing the pressure in the shut-off valve portion 52, thus causing the shuttle 70 to move to the open position.

In the exemplary embodiment, the actuating element 80 is movable between the open and closed positions based on a temperature of the water. For example, the actuator body 90 includes a wax or a mixture of wax and metal powder (e.g., copper powder) enclosed in the actuator body 90 by means of a membrane made of elastomer or the like. Upon heating, the wax or wax with copper powder mixture slowly expands, thereby pushing the piston 96 and poppet 94 in an outward direction. Upon cooling, the wax or wax/copper powder mixture contracts and the rod member 92 is pushed inward by the bias spring 82 until the flange 98 contacts the actuator body 90 at an actuator seat. The wax filled cartridge type of thermal actuator allows the wax to be formulated to change from the solid to the liquid state at a particular desired temperature. The rate of expansion with respect to temperature at this change of state results in almost snap action of the actuator body 90. The temperature set point is equal to a preset value, such as 97 degrees Fahrenheit, desired for the hot water. A "sudden" large physical motion is provided over a small temperature change. As stated above, this movement is reacted by the bias spring 82, which returns rod member 92 as the temperature falls. In alternative embodiments, other types of thermal actuators, such as bimetallic springs and memory alloys (e.g., Nitinol and the like) may be utilized. The valve body 51 is designed so the components of the bypass valve portion 54 can fit through either of the inlet and/or discharge ports, such as with a snap-in fit. In this manner, no intermediate or additional joints are required for installation.

Figure 6:
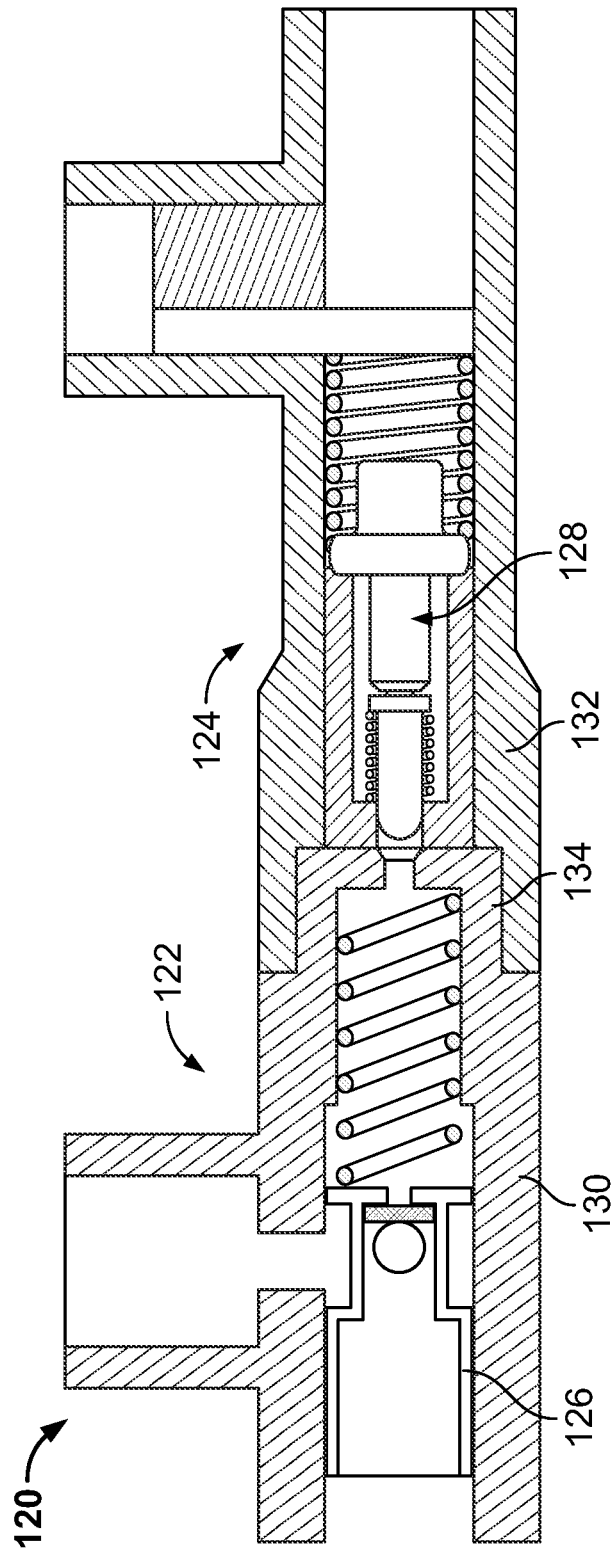
FIG. 6 is a side elevation view of an alternative valve assembly for use with the water circulation system shown in FIG. 1 and formed in accordance with an alternative embodiment.

FIG. 6 is a side elevation view of an alternative valve assembly 120 for use with the water circulation system 10 shown in FIG. 1. The valve assembly 120 includes a shut-off valve portion 122 and a bypass valve portion 124. The shut-off valve portion 122 includes a movable shuttle 126 that may restrict flow of water from the shut-off valve portion 122 based on a position of the shuttle 126. The bypass valve portion 124 includes a thermally sensitive actuating element 128 that may restrict flow of water through the bypass valve portion 124 based on a temperature of the water flowing therethrough.

In contrast to the valve assembly 50 (shown in FIG. 5), the valve assembly 120 is of a multiple-piece construction, wherein the shut-off valve portion 122 is separately provided from and coupled to the bypass valve portion 124. For example, the shut-off valve portion 122 includes a valve body 130 and the bypass valve portion 124 includes a valve body 132. The valve bodies 130, 132 are coupled to one another at an interface 134, such as by a threaded coupling, a welding or soldering process, a flange coupling, and the like. In an alternative embodiment, the valve bodies 130, 132 are not directly coupled to one another. Rather, each valve body 130, 132 includes an intermediate port opposite one of the inlet port or the discharge port. The intermediate ports of each valve body 130, 132 are interconnected with one another by a plumbing line, such as a flexible plumbing line. The portions 122, 124 may thus be located remote from one another.

Figure 7:
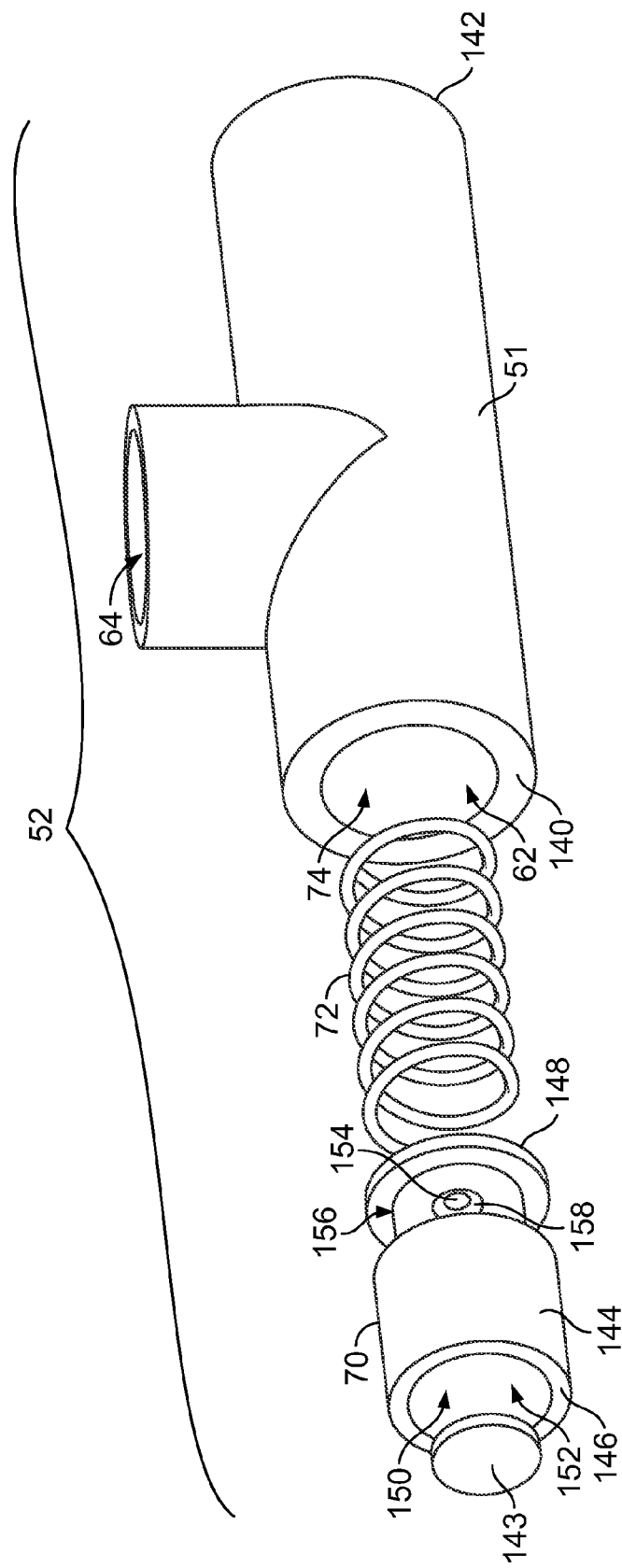
FIG. 7 is an exploded perspective view of a portion of the valve assembly shown in FIG. 5.

FIG. 7 is an exploded perspective view of the shut-off valve portion 52 of the valve assembly 50 shown in FIG. 5. The valve body 51 of the shut-off valve portion 52 extends between an inlet end 140 and a bypass end 142. The inlet end 140 of the shut-off valve portion 52 coincides with the first end 56 (shown in FIG. 5) of the valve assembly 50. The inlet port 62 is provided at the inlet end 140 and the discharge port 64 is positioned between the inlet end 140 and the bypass end 142. As described above, the bypass valve portion 54 (shown in FIG. 5) would extend from the bypass end 142. As further described above with reference to FIG. 6, the bypass valve portion 54 may be coupled to the bypass end 142, such as by a threaded coupling, in an alternative embodiment.

The valve body 51 of the shut-off valve portion 52 includes the tubular chamber 74 extending axially between the inlet end 140 and the bypass end 142. The shuttle 70 and the return spring 72 are received within the chamber 74. When loaded, the return spring 72 is positioned between the shuttle 70 and the bypass end 142. In one embodiment, a screen 143 is provided and received within the shuttle 70.

The shuttle 70 includes a shuttle body or sleeve 144 extending between an inlet end 146 and a discharge end 148. The inlet end 146 faces the inlet end 140 of the shut-off valve portion 52 and the discharge end 148 faces the bypass end 142 when assembled. The shuttle 70 includes an inlet opening 150 at the inlet end 146 to allow water to flow into an inner chamber 152 of the shuttle 70 from the inlet port 62 of the valve assembly 50. The shuttle 70 includes a discharge opening 154 at the discharge end 148 to allow water to flow toward the bypass end 142 and the passage 61 (shown in FIG. 5). An annular groove 156 extends circumferentially around the shuttle 70. The groove 156 defines a section of reduced cross section as compared to the sections immediately adjacent to the groove 156. Optionally, the groove 156 may extend less than entirely circumferentially around the shuttle 70. At least one passage 158 opens to the groove 156 such that the inner chamber 152 and the groove 156 are in flow communication with one another. As such, water flowing through the inlet opening 150 may flow to the groove 156 via the passages 158.

Figure 8:
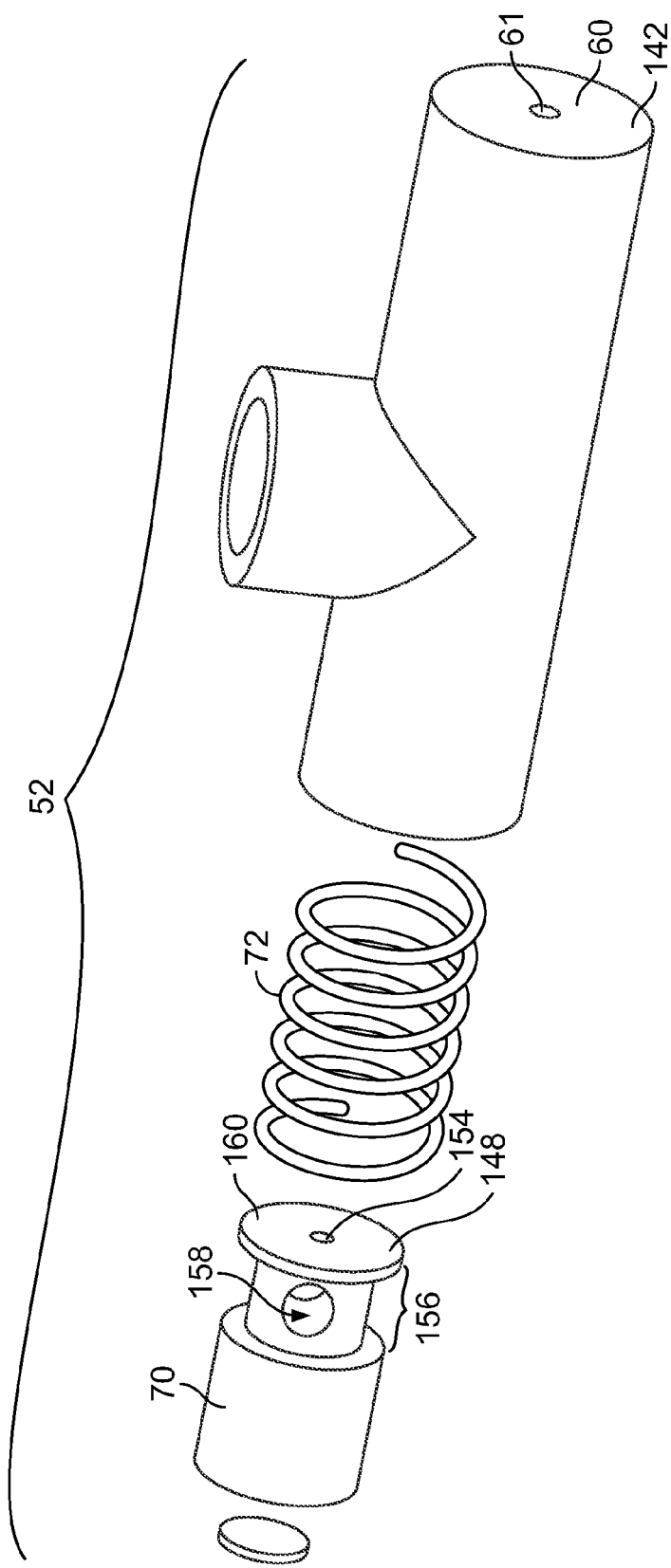
FIG. 8 is another exploded perspective view of the portion of the valve assembly shown in FIG. 7.

FIG. 8 is another exploded perspective view of the shut-off valve portion 52 of the valve assembly 50 shown in FIG. 5 viewing the shut-off valve portion 52 from the bypass end 142. The passage 61 is provided in the separating wall 60 of the valve assembly 50, and the passages 158 open to the groove 156.

FIG. 8 further illustrates the discharge end 148 of the shuttle 70, including the discharge opening 154. Optionally, a diameter of the discharge opening 154 may be substantially smaller than a diameter of the shuttle 70 at the discharge end 148. As such an end wall 160 is defined at the discharge end 148. The end wall 160 may engage the return spring 72 when the shut-off valve portion 52 is assembled. In an alternative embodiment, the diameter of the discharge opening 154 may be substantially equal to the diameter of the inner chamber 152. As such, a greater volume of water may be dispelled from the discharge opening 154 as compared to an opening of smaller diameter. Optionally, the diameter of the discharge opening 154 may be substantially equal to the diameter of the passage 61 in the separating wall, and the diameter may be selected based upon the amount of flow through the valve assembly 50 that a user selects.

Figure 9:
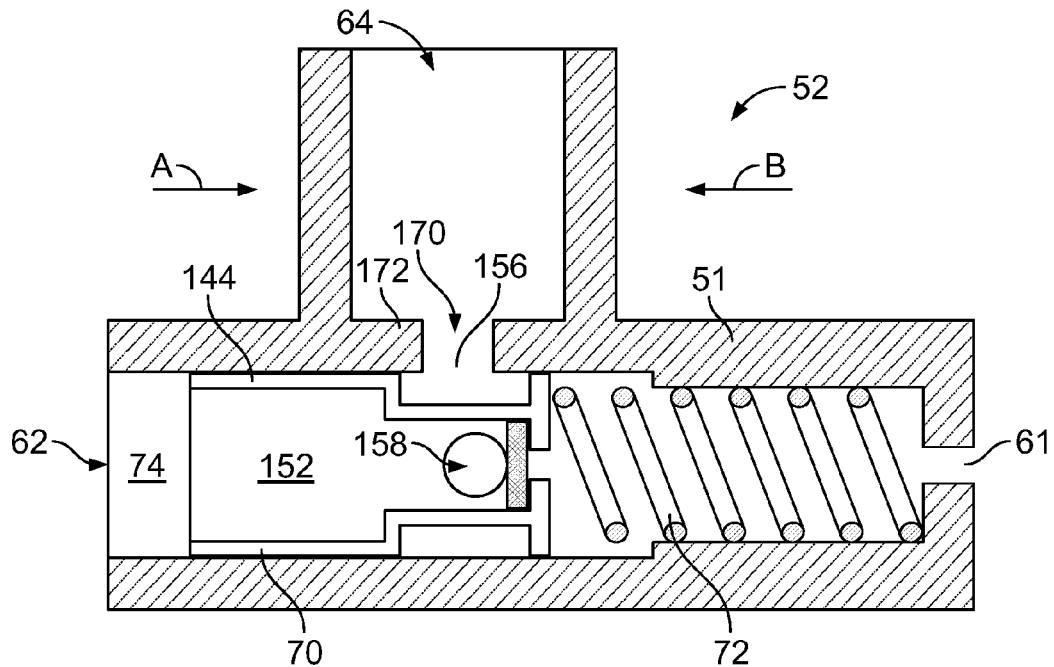
FIG. 9 is a side elevation view of the portion of the valve assembly shown in FIG. 7 in a first operational position.
Figure 10:
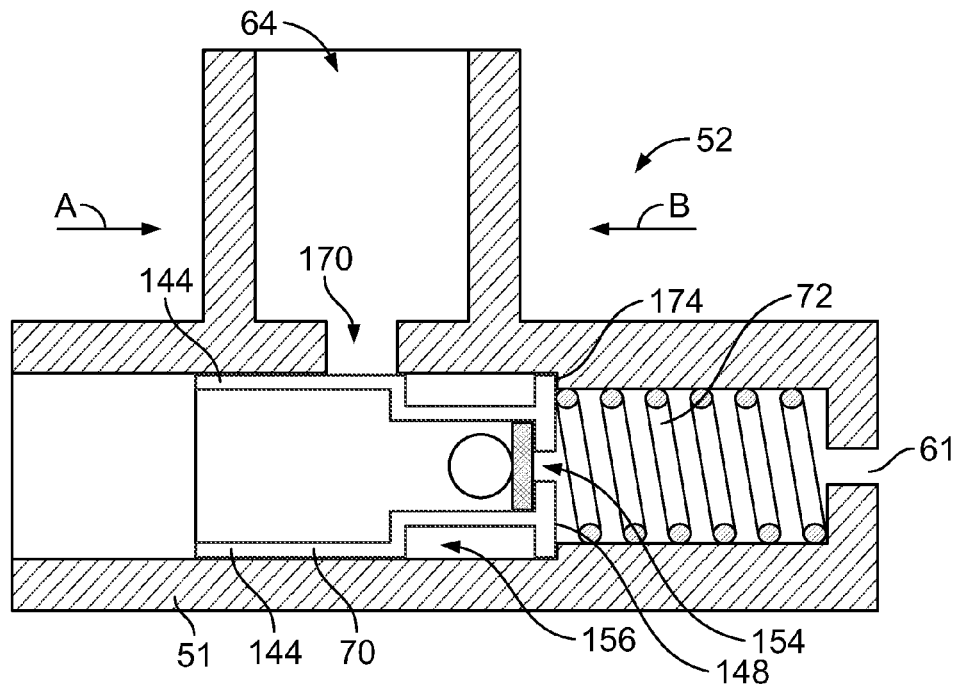
FIG. 10 is a side elevation view of the portion of the valve assembly shown in FIG. 9 in a second operational position.

FIG. 9 is a side elevation view of the shut-off valve portion 52 in a first, or open, operational position. FIG. 10 is a side elevation view of the shut-off valve portion 52 in a second, or closed, operational position. In the open position, the shuttle 70 is positioned to allow water flow to the discharge port 64. In the closed position, the shuttle 70 is positioned to shut off water flow to the discharge port 64. In an exemplary embodiment, the position of the shuttle 70 is based on the pressure of the water. For example, when a positive pressure is applied to the water, such as by the pump 16 (shown in FIG. 1), the water forces the shuttle 70 to the closed position. For example, the water may push against the end wall 160 of the shuttle 70 forcing the shuttle in a closing direction generally toward the bypass end 142 of the shut-off valve portion 52, shown by arrow A. When the pressure is equalized, such as when the actuating element 80 (shown in FIG. 5) closes the passage 61, then the return spring 72 forces the shuttle 70 in an opening direction generally toward the inlet end 140, shown by arrow B, to the open position. The operation of the shut-off valve is described in further detail below.

As illustrated in FIG. 9, in the open position, the shuttle 70 is positioned within the valve body 51 such that the groove 156 is aligned with the discharge port 64 of the valve assembly 50 (shown in FIG. 5). More specifically, the groove 156 is aligned with an opening 170 through a wall 172 in communication with the discharge port 64. Water flowing into the groove 156 from the inner chamber 152 of the shuttle 70 is able to flow through the opening 170 and out through the discharge port 64. As described above, the water flows from the inner chamber 152 to the groove 156 via the passages 158. Optionally, the above described flow path may define the only flow path between the inlet port 62 and the discharge port 64. For example, in the illustrated embodiment, the shuttle body 144 is sized to substantially fill the chamber 74 of the valve body 51, thus restricting flow of water between the shuttle body 144 and the valve body 51. Optionally, a seal may be positioned between the shuttle body 144 and the valve body 51.

As illustrated in FIG. 10, in the closed position, the shuttle 70 is positioned within the valve body 51 such that the groove 156 is not aligned with the discharge port 64 of the valve assembly 50. More specifically, the shuttle body 144 is aligned with the opening 170 and blocks water flow therethrough. However, water flow is still allowed through the discharge opening 154 at the discharge end 148 of the shuttle 70. In the closed position, the shuttle 70 compresses the return spring 72 until the shuttle engages a shoulder 174. The shoulder 174 is spaced apart from the opening 170 by a distance to allow un-alignment of the groove 156 and the opening 170. In an alternative embodiment, in the closed position, the shuttle 70 is positioned within the valve body 51 such that less than full flow is allowed to the discharge port 64. For example, half or quarter flow may be allowed to the discharge port 64 such that the amount of water discharged from the discharge port 64 is greatly reduced. Such a low flow condition may be a visual or tactile indication to the user that the water temperature is reduced or inadequate. In one embodiment, only a trickle flow of water is allowed.

An exemplary valve assembly operation will be described with reference to the above Figures, and particularly, with reference to operating the water circulation system 10 using the valve assembly 50. Normally, the shut-off valve portion 52 is in the open position. When flow demand is detected by the controller 28 and/or pump 16, the pump 16 is activated. For example, when the hot faucet is opened and water from the hot pipes flows through the discharge port 64, the flow may be detected by a sensor 26. The demand may be detected in other ways, such as with a different type of sensor or switch. Additionally, the timer 24 may be activated when flow is detected. Activation of the pump 16 boosts the flow of hot water through the hot water pipes to the fixture 12. By boosting the flow, the pressure of the water in the hot water pipes is higher than the pressure of the water in the cold water pipes. This difference in pressure forces the shut-off valve to close. For example, the pressure differential across the end wall 148 is great enough to overcome the return force the return spring 72, thus shifting the shuttle 70 against the spring 72 and forcing the shuttle 70 to the closed position. In the closed position, the shuttle 70 shuts off the flow of water to the discharge port 64, thus restricting flow of hot water from the fixture 12. As a result, water is not wasted from the fixture 12. Rather, the water is dispelled through the passage 61 into the bypass valve portion 54. The bypass flow continues through the passage 61 across the actuating element 80.

As described above, as the actuating element 80 is heated, the actuating element 80 expands to close off the passage 61. As such, the actuating element 80 is controlled based on temperature of the water. Once the actuating element 80 closes off the passage 61 (e.g. at the desired water temperature), the pressure differential in the shut-off valve portion 52 is diminished, and may be eliminated. At a predetermined threshold, the return force of the return spring 72 will be greater than the pressure force of the water on the shuttle 70. At the threshold, the shuttle 70 will be forced to the open position by the return spring 72 and the water will be allowed to flow through the discharge port 64. More specifically, water having a desired temperature will be allowed to flow through the discharge port 64, thus reducing or possibly eliminating water waste. As a result, the state of the valve assembly is based on a temperature of the water and on a pressure of the water. For example, the bypass valve portion 54 is controlled based on a temperature of the water and the shut-off valve portion 52 is controlled based on a pressure of the water.

Furthermore, once the shuttle 70 returns to the open position and water is allowed to flow to the discharge port 64, a flow change will occur through the system. For example, the amount of flow will be markedly increased. Such an increase may be sensed by a sensor 26, such as a flow sensor, temperature sensor, pressure sensor, and the like. A control signal may be sent to the controller 28, and the controller may de-activate the pump 16. As such, the operation of the pump may be controlled, both activation and de-activation, based on a water characteristic.

Figure 11:
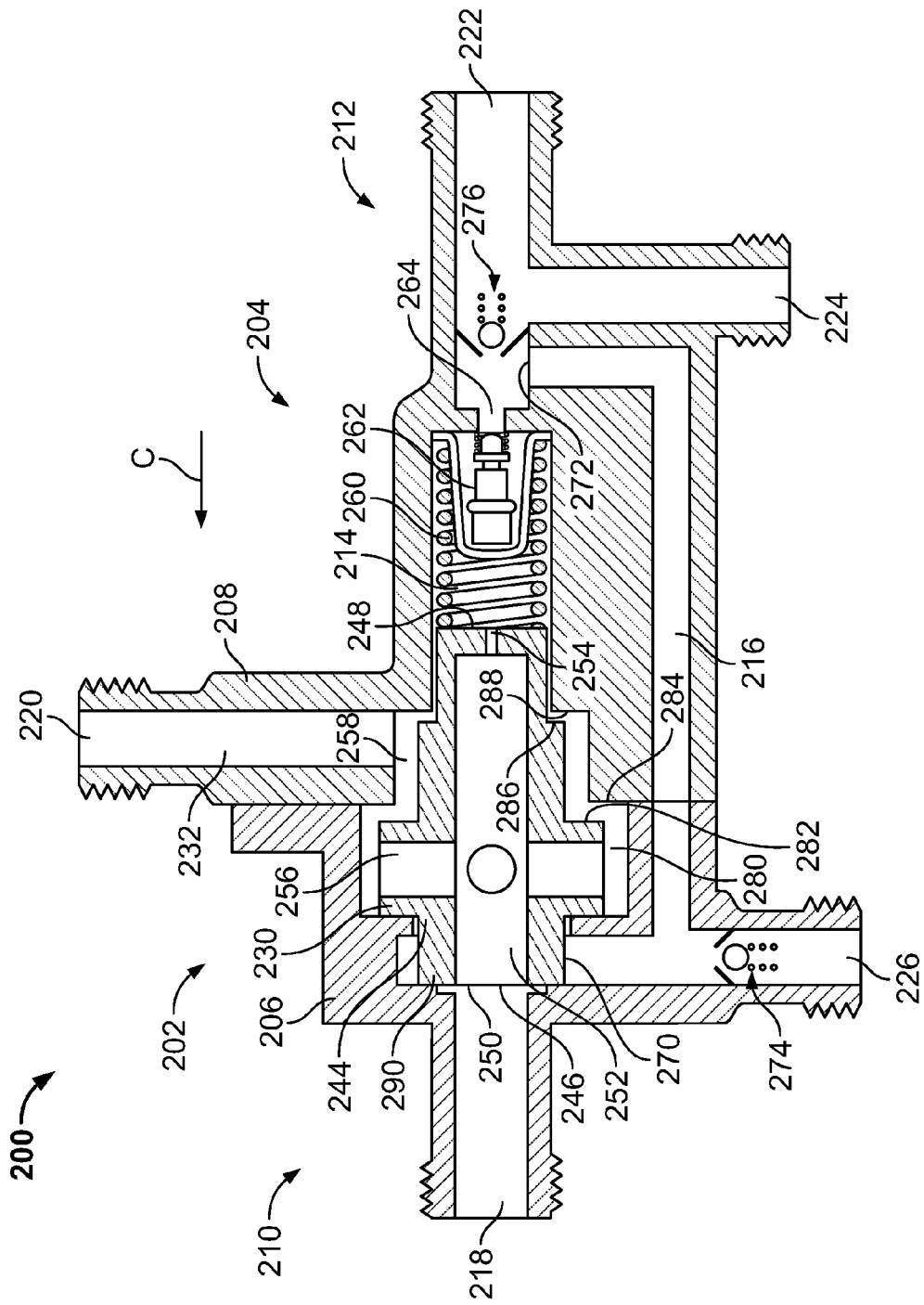
FIG. 11 is a side elevation view of another alternative valve assembly formed in accordance with an alternative embodiment and shown in a first operational state.
Figure 12:
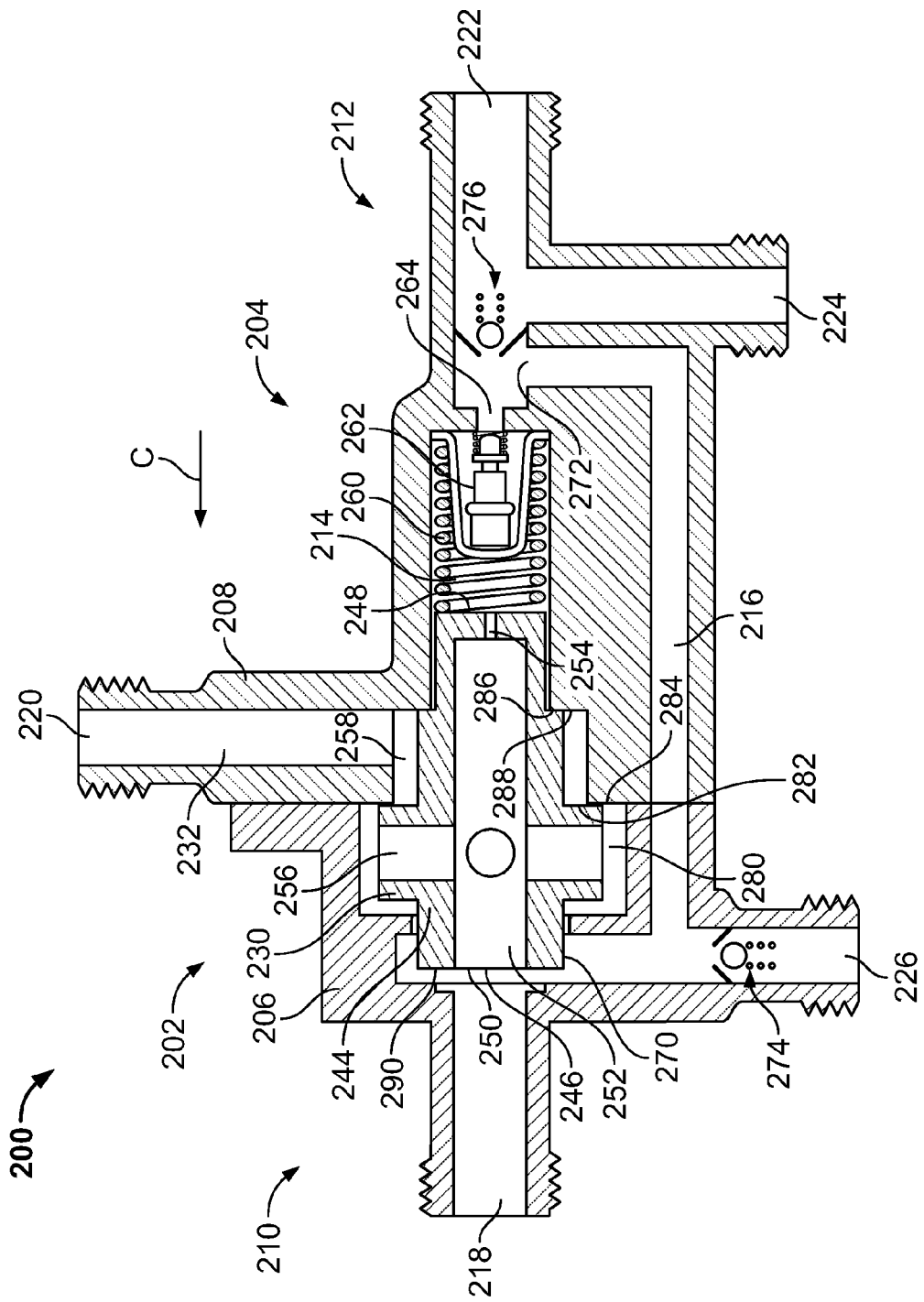
FIG. 12 is a side elevation view of the valve assembly shown in FIG. 11 and shown in a second operational state.

FIGS. 11 and 12 are side elevation views of an alternative valve assembly 200 with a portion of the valve assembly 200 cutaway to illustrate the various components of the valve assembly 200. FIG. 11 illustrates the valve assembly 200 in a first state and FIG. 12 illustrates the valve assembly 200 in a second state. The valve assembly 200 could be used in place of the valve assembly 14 (shown in FIG. 1). The valve assembly 200 includes a shut-off valve portion 202 and a bypass valve portion 204. In the illustrated embodiment, the shut-off valve portion 202 has a first body 206 and the bypass valve portion 204 has a second body 208 that are coupled to one another. However, in alternative embodiments, a single body may be used to define both portions 202, 204. The first body 206 defines a first end 210, sometimes referred to as a hot end 210 of the valve assembly 200. The second body 208 defines a second end 212, sometimes referred to as a cold end 212, of the valve assembly 200.

Walls of the bodies 206, 208 define passages therethrough for directing fluid flow through the valve assembly 200. In an exemplary embodiment, the valve assembly 200 includes a main passage 214 that interconnects the first end 210 and the second end 212 and allows fluid to flow therethrough. The valve assembly 200 also includes a secondary passage 216 that interconnects the first end 210 and the second end 212 and allows fluid flow therethrough, however, the valve assembly 200 may be constructed and operated without the secondary passage 216 in some alternative embodiments, as will be described below in further detail.

In the illustrated embodiment, the valve assembly 200 has five threaded ports, namely a hot inlet port 218, a hot discharge port 220, a cold inlet port 222, a cold discharge port 224 and a dedicated return port 226. Additional ports, or ports having different functions, may be provided in alternative embodiments. The valve assembly 200 may be operated without the use of the dedicated return port 226 in some alternative embodiments. For example, a plug or cap may be provided to restrict flow through the dedicated return port 226, and bypass flow is thus discharged through the cold inlet port, and through the cold water supply lines to the hot water heater. Alternatively, the valve assembly 200 may not include the dedicated return port 226.

The shut-off valve portion 202 includes a shuttle 230 that is received within the main passage 214. In the illustrated embodiment, the shuttle 230 is received within the main passage 214 of both the first and second bodies 206, 208. However, the shuttle 230 may be entirely positioned within either the first body 206 or the second body 208 in alternative embodiments. The shuttle 230 is moveable within the main passage 214 between a first, or open, operational position, such as the position shown in FIG. 11, and a second, or closed, operational position, such as the position shown in FIG. 12. The opened and closed operational positions generally refer to the whether or not water is able to flow through a hot water discharge passage 232 to the hot water discharge port 220. For example, in the open position, water is able to flow to the hot water discharge passage 232. In the closed position, water is restricted from flowing to the hot water discharge passage 232. As such, the shuttle 230 is used to control water flow to the hot water discharge port 220.

The shuttle 230 includes a shuttle body or sleeve 244 extending between an inlet end 246 and a discharge end 248. The inlet end 246 faces and receives water from the hot inlet port 218 and the discharge end 248 faces and dispels water into the main passage 214 to be channeled to the bypass valve portion 204. The shuttle 230 includes an inlet opening 250 at the inlet end 246 to allow water to flow into an inner chamber 252 of the shuttle 230 from the hot inlet port 218 of the valve assembly 200. The shuttle 230 includes a discharge opening 254 at the discharge end 248 to allow water to flow toward the bypass valve portion 204. The discharge opening 254 is sized to allow a predetermined amount of water flow through the shuttle 230 to the bypass valve portion 204. For example, the discharge opening 254 may be sized relatively small as compared to the diameter of the inner chamber 252 to allow a small, perhaps trickle type of flow, to the bypass valve portion 204. Alternatively, the discharge opening 254 may be sized approximately the same size as the inner chamber 252 to allow a large flow, such as a flow similar to the flow typically experienced from the fixture, or perhaps a flow similar to the flow limit of the water supply system of the home.

In an exemplary embodiment, radial passages 256 extend outward from the inner chamber 252. The passages 256 allow water to flow out of the shuttle 230 to a dispensing chamber 258 of the valve assembly 200. The dispensing chamber 258 is in fluid communication with the hot water discharge passage 232 such that water flowing through the passages 256 is able to flow into the hot water discharge passage 232. More particularly, the dispensing chamber 258 is in fluid communication with the hot water discharge passage 232 when the shuttle 230 is in the open position. However, as will be described in further detail below, when the shuttle 230 is in the closed position, the dispensing chamber 258 is not in fluid communication with the hot water discharge passage 232.

In an exemplary embodiment, a return spring 260 is provided that biases against the shuttle 230. The return spring 260 is positioned between the shuttle 230 and the second body 208 and provides a return force on the shuttle 230 to maintain a position of the shuttle 230 at certain times. In an exemplary embodiment, the return spring 260 pushes against the shuttle 230 to generally force the shuttle 230 to the open position, generally in the direction of arrow C. However, at certain times, the pressure of the water flowing into the shuttle from the hot inlet port 218 may overcome the bias force of the return spring 260 on the shuttle 230, thus moving the shuttle 230 to the closed position. For example, a pressure difference of the water may overcome the return force of the return spring 260 and cause the shuttle 230 to move to the closed position. However, when the differential pressure of the water across the passage 264 in the valve assembly 200 is below a certain amount, the return spring 260 may return the shuttle 230 to the open position.

In an exemplary embodiment, the bypass valve portion 204 of the valve assembly 200 includes a flow control unit for controlling the flow of water through the bypass valve portion 204. In the illustrated embodiment, the flow control unit is represented by a thermally sensitive actuating element 262, similar to the actuating element 80. The actuating element 262 may operate in a similar manner as the actuating element 80 to close off a bypass passage 264 that fluidly couples the main passage 214 and the cold inlet and discharge ports 222, 224 at the second end 212. In an exemplary embodiment, the actuating element 262 is received within a casing 266 at an end of the main passage 214. The casing 266 allows water to flow through and/or around the casing body, such that the water flows past and along the actuating element 262. As such, the actuating element 262 may be operated (e.g. expanded and contracted) based on a temperature of the water to close and open the bypass passage 264.

In operation, the actuating element 262 is movable between an open position, as illustrated in FIG. 11, and a closed position. In the open position, water is allowed to flow through the bypass passage 264 from the main passage 214 to the second end 212. As such, water flows from the hot side to the cold side of the valve assembly 200. In this way, the cooled water may be dispelled from the hot water lines, thus bringing hot water to the hot side of the valve assembly 200 for dispensing at the fixture. In the closed position, the actuating element 262 seats against a valve seat, such as the opening of the bypass passage 264 and water is restricted from flowing through the bypass passage 264. As will be explained in further detail below, when the actuating element 262 is closed, the pressure upstream of the actuating element 262 (e.g. in the main passage 214) may be affected, such as by equalizing the pressure in the main passage, thus causing the shuttle 230 to move to the open position.

In alternative embodiments, other types of devices, other than the thermally sensitive actuating element 262, may be used to control flow through the bypass portion 204. For example, the device may be electrically actuated, hydraulically actuated, pneumatically actuated, and the like. The flow control unit may be thermally actuated, such as the actuating element 262 or other types of thermally actuated devices, or the flow control unit may be actuated in response to other types of stimuli, such as pressure, flow, manual activation, and the like.

The valve assembly 200 includes the secondary passage 216 that fluidly connects a first end port 270 with the dedicated return port 226, if provided, and the cold inlet port 222 at the second end 212. In an exemplary embodiment, the secondary passage 216 defines a bypass passage 216 that permits recirculating flow through the valve assembly 200. A portion of the secondary passage 216 is defined within the shut-off valve portion 202 and a portion of the secondary passage 216 is defined within the bypass valve portion 204. In an exemplary embodiment, the first end port 270 is an annular port provided at a first end of the secondary passage 216 and a second end port 272 is provided at a second end of the secondary passage 216. In operation, water is able to flow into the secondary passage 216 through the first end port 270 and/or the second end port 272, as will be described in further detail below.

In an exemplary embodiment, a dedicated return flow limiter 274 is provided between the secondary passage 216 and the dedicated return port 226 to prevent flow from the dedicated return port into the secondary passage 216. A cold end flow limiter 276 is provided between the cold inlet port 222 and the secondary passage 216 to prevent flow from the cold inlet port 222 into the secondary passage 216. The flow limiters 274, 276 may be check valves or other types of valves or devices that allow flow in certain situations and restrict flow in other situations.

An exemplary operation of the valve assembly 200 is described below with reference to FIGS. 11 and 12. Different configurations of the valve assembly 200 may operate differently. For example, the valve assembly 200 operates differently when used within a system having a dedicated return line coupled to the dedicated return port 226, as compared to when the valve assembly 200 is used within a cold water return type of system, such as when no dedicated return port 226 is provided or when the dedicated return port 226 is plugged or capped. The valve assembly 200 may operate differently depending on the operational status of the pump, such as on, off, low speed, high speed, low pressure, high pressure and the like. The valve assembly 200 may operate differently depending on the operational state of the actuating element 262, such as open or closed.

FIG. 11 illustrates the shuttle 230 in an open position and the actuating element 262 in an open position. The pump 16 is in an off state. The shuttle 230 is held in the open position by the return spring 260. The pressure of the water at the hot end 210 is approximately the same as the pressure at the cold end 212. Water from the hot end 210 and the hot inlet port 218 is able to flow through the inner chamber 252 of the shuttle 230 and through the discharge opening 254 and/or the radial passages 256. The water flowing through the radial passages 256 flows into a radial annulus 280 between the shuttle 230 and the bodies 206, 208. In an exemplary embodiment, the water within the annulus 280 flows into a downstream end of the main passage 214 to the actuating element 262 and the bypass passage 264, and the water flowing through the discharge opening 254 of the shuttle 230 flows into the downstream end of the main passage 214 to the actuating element 262 and the bypass passage 264. In an alternative embodiment, the water within the annulus 280 is restricted from flowing into the downstream end of the main passage 214, such as by a seal, such that only water flowing through the discharge opening 254 of the shuttle 230 is able to flow into the downstream end of the main passage 214 to the actuating element 262 and the bypass passage 264.

When the pump 16 (shown in FIG. 1) is activated, such as by a timer, a manual switch, a flow switch, or another type of sensor, the flow and/or pressure of the water within the hot supply line is boosted or increased. Optionally, the pump 16 may be operated at a low speed and/or a low pressure, such as when a demand condition is not sensed (e.g. when the timer activates the pump). The boosted water flows through the inner chamber 252 and out of the shuttle 230 through the discharge opening 254 and/or the radial passages 256 to the actuating element 262 and through the open bypass passage 264. The boosted water encounters the cold end flow limiter 276. The flow limiter 276 may be configured to restrict water flow therethrough until the water reaches or exceeds a predetermined pressure. For example, a spring may be provided that holds a valve closed, and water pressure above a certain amount will overcome the spring force and allow water flow therethrough.

When the boosted flow is below the threshold level, the flow continues through the secondary passage 216 toward the dedicated return port 226. When the valve assembly 200 is configured for bypass flow through a dedicated return line (e.g. when a dedicated return line is coupled to the dedicated return port 226), the boosted water flow encounters the dedicated return flow limiter 274. The flow limiter 274 may be configured to restrict water flow therethrough until the water reaches or exceeds a predetermined pressure. For example, a spring may be provided that holds a valve closed, and water pressure above a certain amount will overcome the spring force and allow water flow therethrough. Optionally, the threshold pressure for the dedicated return flow limiter 274 may be less than the threshold pressure for the cold end flow limiter 276. As such, the dedicated return flow limiter 274 opens before the cold end flow limiter 276 and the pressure remains lower than the threshold of the cold end flow limiter 276 as long as the dedicated return flow limiter 274 remains open.

In an alternative operation, when the dedicated return port 226 is capped or plugged, or when no dedicated return port 226 is provided, the water is bypassed through the cold end 212. For example, the pressure of the water flowing into the secondary passage 216 and the cold end 212 through the bypass passage 264 exceeds the predetermined threshold of the cold end flow limiter 276, and the bypass water is allowed to flow therethrough. The water is then permitted to bypass through the cold inlet port 222, through the cold supply lines and back to the hot water heater.

The bypass flow through the valve assembly 200 dispels the cooled or tepid water in the hot supply line. The temperature of the water at the hot end 210 is increased as the tepid water is bypassed through the valve assembly 200. The hotter water eventually flows over the actuating element 262, causing the actuating element 262 to expand and close, thus restricting water flow through the bypass passage 264. Optionally, when the actuating element 262 is closed, the pump is turned off. For example, the controller may turn the pump 16 off when a predetermined condition is sensed, such as a flow sensor senses that recirculating flow has stopped, a pressure sensor senses a change in pressure of the water within the system indicating that the actuating element has closed, a sensor associated with the actuating element 262 may indicate that the actuating element 262 has closed, and the like. When the actuating element 262 is closed, the pressure of the water in the main passage 214 is generally equalized with the pressure of the water in the inner chamber 252, and the return spring 260 holds the shuttle 230 in the open position. In such a state of having hot water at the hot inlet port 218, the actuating element 262 closed, and the shuttle 230 open, opening of the hot water faucet allows hot water to flow through the hot discharge port 220 via the passages 256 and the annulus 280.

In an alternative operation state, such as when tepid water is at the hot inlet port 218, the actuating element 262 is open, and the shuttle 230 open, opening of the hot water faucet causes the valve assembly 200 to operate differently than when hot water is at the hot inlet port 218. Opening the hot faucet causes a surge of flow through the hot water supply pipes. The surge in flow is detected by a sensor and/or the pump, and the pump is turned on, if the pump is not already on. Optionally, if a variable speed pump is provided, the pump may operate at a low speed during normal recirculation and the pump may operate at a high speed when a demand situation occurs, such as when the user opens the faucet or activates a manual switch, or at predetermined times of the day, and the like. Operating the pump boosts the pressure of the water flowing through the system. For example, the pressure of the water at the inlet end 246 of the shuttle 230 may be higher than the water pressure in the main passage 214 at the discharge end 248 of the shuttle 230. The pressure difference may be enough to overcome the spring force of the return spring 260 holding the shuttle 230 in the open position, thus forcing the shuttle 230 to the closed position, such as the position shown in FIG. 12.

FIG. 12 illustrates the shuttle 230 in a closed position, in which the shuttle 270 closes off the annulus 280 such that water is unable to flow to the hot water discharge passage 232 and the hot water discharge port 220. Optionally, and as illustrated in FIG. 12, seals 282, such as o-rings, may be provided on the shuttle 230 proximate the discharge port of the radial passages 256. The seals 282 seal against a shoulder 284 of the second body 208, however, the shoulder 284 may be provided on the first body 206 in alternative embodiments. Additionally, a second seal 286 seats against a second shoulder 288 to stop water flow from leaking from the main passage 214 back around the discharge end 248 of the shuttle 230 and into the hot water discharge passage 232. In the closed position, the annulus 280 is in fluid communication with the first end port 270 of the secondary passage 216 such that water flowing through the radial passages 256 from the inner chamber 252 is able to flow into the secondary passage 216. The water flowing into the secondary passage 216 is discharged through the dedicated return port 226 or the cold inlet port 222, depending on the type of recirculation system used. Optionally, the bypass flow entering the secondary passage 216 from the annulus 280 has a higher volume than the bypass flow through the bypass passage 264 such that a greater volume of water may be recirculated through the valve assembly 200.

As the tepid water is dispelled from the hot water supply lines, hot water will eventually be presented to the valve assembly 200. When the hot water is at the valve assembly 200, the actuating element 262 is closed. Once the actuating element 262 is closed, the pressure of the water in the main passage 214 downstream of the shuttle 230 rises to substantially equalize with the pressure of the water at the hot water inlet port 218 and/or within the inner chamber 252. When the pressures are substantially equalized, the spring force of the return spring 260 forces the shuttle 230 to the open position. In the open position, the water flows from the inner chamber 252 to the hot water discharge port 220 via the annulus 280. Additionally, in the open position, the first end port 270 of the secondary passage 216 is closed off and may be sealed by a seal 290. Additionally, the seal 290 may be provided at the inlet end 246 of the shuttle 230 to seal the first end port 270.

Figure 13:
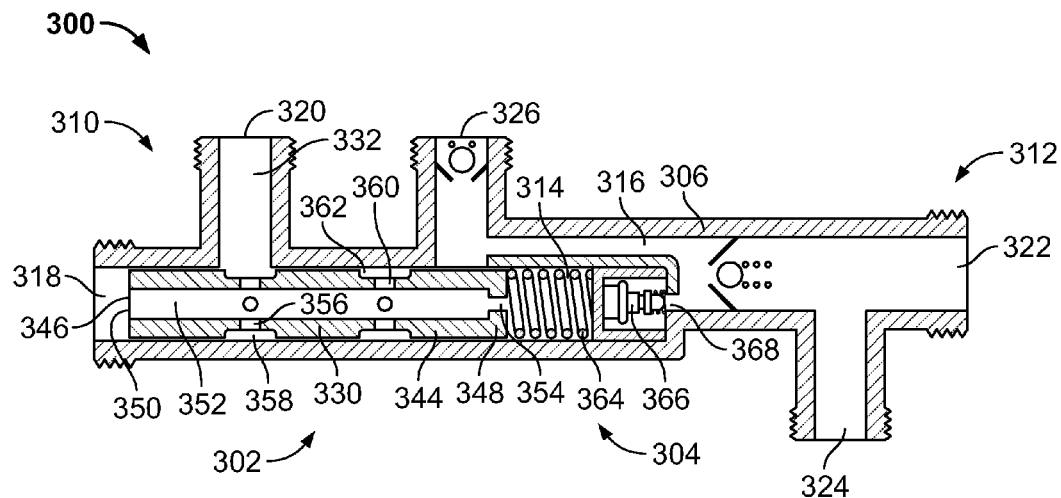
FIG. 13 is a side elevation view of a further alternative valve assembly formed in accordance with an alternative embodiment and shown in a first operational state.
Figure 14:
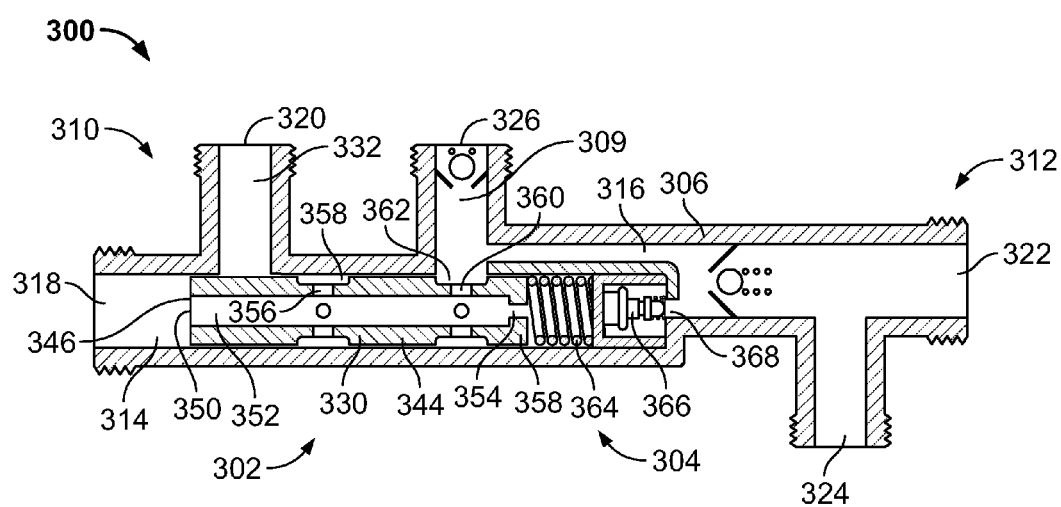
FIG. 14 is a side elevation view of the valve assembly shown in FIG. 13 and shown in a second operational state.

FIGS. 13 and 14 illustrate another alternative valve assembly 300 similar to the valve assemblies described above. FIG. 13 illustrates the valve assembly 300 in a first state and FIG. 14 illustrates the valve assembly 300 in a second state. The valve assembly 300 includes a shut-off valve portion 302 and a bypass valve portion 304. In the illustrated embodiment, the shut-off valve portion 302 has a valve body 306 defining a first end 310, sometimes referred to as a hot end 310 of the valve assembly 300 and a second end 312, sometimes referred to as a cold end 312, of the valve assembly 300.

Walls of the body 306 define passages therethrough for directing fluid flow through the valve assembly 300. In an exemplary embodiment, the valve assembly 300 includes a main passage 314 that allows flow from the first end 310 and the second end 312 when a bypass passage 368 is closed and allows fluid to flow therethrough. The valve assembly 300 also includes a secondary passage 316 that interconnects the first end 310 and the second end 312 and allows fluid flow therethrough, however, the valve assembly 300 may be constructed and operated without the secondary passage 316 in some alternative embodiments, as will be described below in further detail. In an exemplary embodiment, the secondary passage 316 defines a bypass passage 316 that permits recirculating flow through the valve assembly 300.

In the illustrated embodiment, the valve assembly 300 has five external ports, namely a hot inlet port 318, a hot discharge port 320, a cold inlet port 322, a cold discharge port 324 and a dedicated return port 326. Additional ports may be provided in alternative embodiments. The valve assembly 300 may be operated without the use of the dedicated return port 320 in some alternative embodiments. For example, a plug or cap may be provided to restrict flow through the dedicated return port 326, and bypass flow is thus discharged through the cold inlet port, through the cold water supply lines to the hot water heater. Alternatively, the valve assembly 300 may not include the dedicated return port 326.

The shut-off valve portion 302 includes a shuttle 330 that is received within the main passage 314. The shuttle 330 is moveable within the main passage 314 between a first, or open, operational position, such as the position shown in FIG. 13, and a second, or closed, operational position, such as the position shown in FIG. 14. In the open position, water is able to flow to a hot water discharge passage 332 associated with the hot water discharge port 320. In the closed position, water is restricted from flowing to the hot water discharge passage 332. As such, the shuttle 330 is used to control water flow to the hot water discharge port 320.

The shuttle 330 includes a shuttle body or sleeve 344 extending between an inlet end 346 and a discharge end 348. The inlet end 346 faces and receives water from the hot inlet port 318 and the discharge end 348 faces and dispels water into the main passage 314 to be channeled to the bypass valve portion 304. The shuttle 330 includes an inlet opening 350 at the inlet end 346 to allow water to flow into an inner chamber 352 of the shuttle 330 from the hot inlet port 318 of the valve assembly 300. The shuttle 330 includes a discharge opening 354 at the discharge end 348 to allow water to flow toward the bypass valve portion 304.

In an exemplary embodiment, hot discharge radial openings 356 are provided through the shuttle sleeve 344 from the inner chamber 352 to a hot discharge annulus 358 surrounding the shuttle sleeve 344. The openings 356 allow water to flow out of the shuttle 330 to the hot discharge port 320 when the valve assembly 300 is in the open position. Bypass radial openings 360 are provided through the shuttle sleeve 344 from the inner chamber 352 to a bypass annulus 362 surrounding the shuttle sleeve 344. The openings 360 allow water to flow out of the shuttle 330 to the secondary passage 316 when the valve assembly 300 is in the closed position. As such, depending on an axial position of the shuttle 330 within the main passage 314, water is allowed to flow along predetermined flow paths. For example, in the open position, the openings 356 are aligned with the hot water discharge port 320 and water from the hot end 310 is allowed to be discharged from the valve assembly therethrough. In the closed position, water is restricted from flowing to the hot water discharge port 320, but rather, the openings 360 are aligned with the secondary passage 316 and water is permitted to flow from the hot end 310 to be bypassed, as described in further detail below.

In an exemplary embodiment, a return spring 364 is provided that biases against the shuttle 330. The return spring 364 operates in a similar manner as the return spring 260 described above to provide a return force on the shuttle 330 to maintain a position of the shuttle 330 at certain times. In an exemplary embodiment, the bypass valve portion 304 of the valve assembly 300 includes a flow control unit for controlling the flow of water through the bypass valve portion 304. In the illustrated embodiment, the flow control unit is represented by a thermally sensitive actuating element 366, similar to the actuating element 262. The actuating element 366 may operate in a similar manner as the actuating element 262 or the actuating element 80 to close off a bypass passage 368 that fluidly couples the main passage 314 and the cold inlet and discharge ports 322, 324 at the second end 312.

In operation, the actuating element 366 is movable between an open position, as illustrated in FIG. 13, and a closed position. In the open position, water is allowed to flow through the bypass passage 368 from the main passage 314 to the second end 312. As such, water flows from the hot side to the cold side of the valve assembly 300. In this way, the cooled water may be dispelled from the hot water lines, thus bringing hot water to the hot side of the valve assembly 300 for dispensing at the fixture. In the closed position, the actuating element 366 seals the passage, such as by seating against a valve seat or filling the opening of the bypass passage 368 and water is restricted from flowing through the bypass passage 368. As will be explained in further detail below, when the actuating element 362 is closed, the pressure upstream of the actuating element 362 (e.g. in the main passage 314) may be affected, such as by equalizing the pressure in the main passage 314, thus causing the shuttle 330 to move to the open position.

In alternative embodiments, other types of devices, other than the thermally sensitive actuating element 366, may be used to control flow through the bypass portion. For example, the device may be electrically actuated, hydraulically actuated, pneumatically actuated, and the like. The flow control unit may be thermally actuated, such as the actuating element 366 or other types of thermally actuated devices, or the flow control unit may be actuated in response to other types of stimuli, such as pressure, flow, manual activation, and the like.

The valve assembly 300 operates in a similar manner as the valve assembly 200 to permit recirculating flow therethrough. For example, the shuttle 330 permits water flow through the discharge opening 354 to fluidly communicate with the actuating element 366 and/or to bypass through the valve assembly 300. Additionally, when the shuttle 330 is moved to the closed position, such as when the differential pressure of the water overcomes the spring force, the water is allowed to flow into the bypass passage 316. The water in the bypass passage 316 flows to either the dedicated return port 326 or the cold water inlet port 322, depending on the type of hot water return system in which the valve assembly is used. Optionally, flow restrictors, such as check valves may be used to control the bypass flow. Optionally, a cap or plug may be used to restrict flow from the dedicated return port 326.

The valve assembly 300 operates in a similar manner as the valve assembly 200 to restrict flow to the hot water discharge port 320 until the temperature of the water is at an acceptable level (e.g. hot rather than tepid). For example, when the pump 16 (shown in FIG. 1) is operated, the pressure of the water in the hot water supply system is boosted. The boosted pressure may overcome the spring force of the return spring 364, and force the shuttle 330 to the closed position. When the actuating element 362 closes (e.g. when the water temperature is hot), the pressure of the water in the main passage 314 may equalize such that the return spring is able to force the shuttle 330 to the open position.

Figure 16:
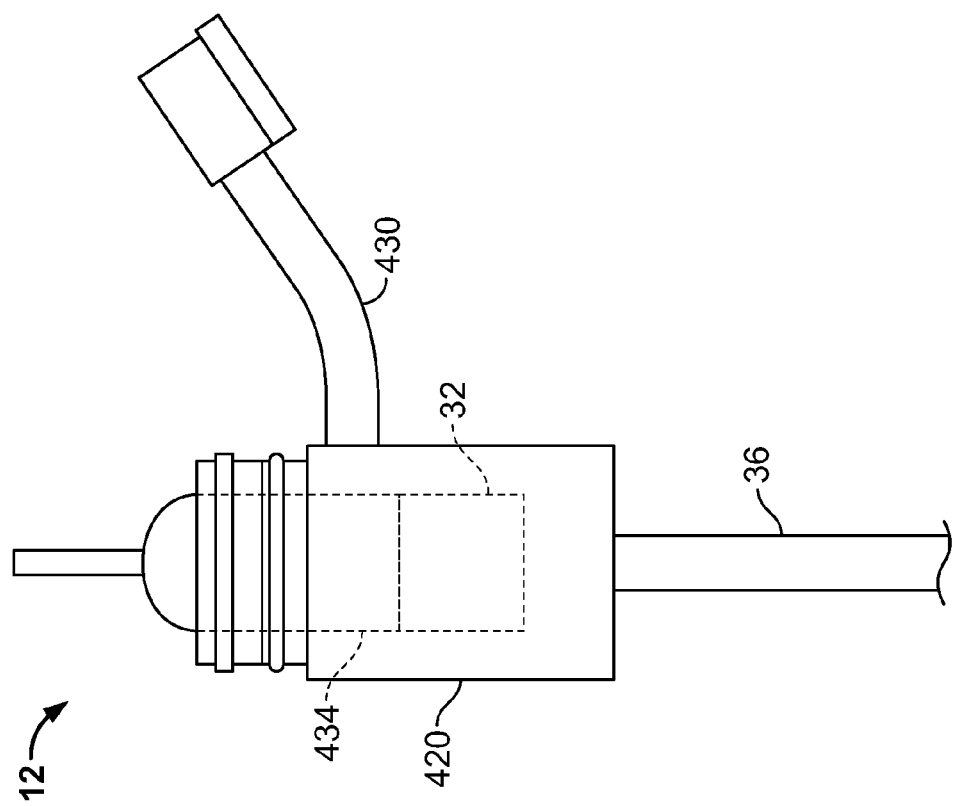
FIG. 16 is a side view of the fixture shown in FIG. 15.
Figure 15:
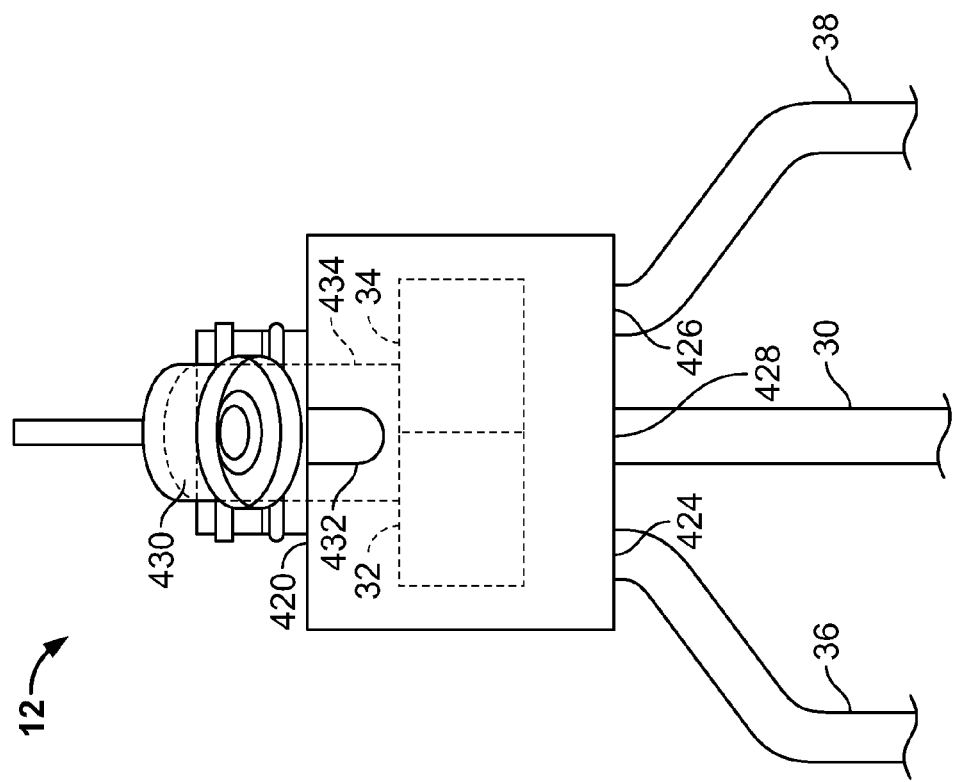
FIG. 15 is a front view of an exemplary fixture for use with the water circulation system shown in FIG. 1 and formed in accordance with an exemplary embodiment.

FIG. 15 is a front view of an exemplary fixture 12 with a decorative cover portion of the fixture 12 removed showing a fixture housing or body 420. FIG. 16 is a side view of the fixture 12. The fixture 12 includes the shut-off valve portion 32 and the bypass valve portion 34 integrated therein, which are illustrated schematically in FIGS. 15 and 16. Alternatively, either the shut-off valve portion 32 or the bypass valve portion 34 may be non-integrated and positioned proximate the fixture 12.

The shut-off valve portion 32 is adapted for limiting the discharge from the fixture 12 of water having a temperature below a desired level. The bypass portion 34 of the fixture 12 is adapted for permitting recirculating flow through the fixture 12. In the illustrated embodiment of FIGS. 15 and 16, the fixture 12 represents one type of sink faucet, such as a single handle sink faucet. It is realized that other types of faucets may be used, such as double handle faucets, dual spout faucets, and the like and it is further realized that the shut-off valve portion 32 and/or the bypass valve portion 34 may be integrated into other types of fixtures, such as a tub/shower fixture, such as at the operating valve portion thereof, an appliance, and like-types of fixtures that supply hot water.

As illustrated in FIGS. 15 and 16, the hot supply line 36 and cold supply line 38 are each connected to the fixture housing 420. Optionally, a dedicated return line may be provided. The hot supply line 36 is connected to a hot water inlet port 424. The cold supply line 38 is connected to a cold water inlet port 226. An outlet spout 430 is coupled to the fixture housing 420 at a discharge port 432. Optionally, multiple spouts and outlet ports may be provided on the fixture housing 420. An internal flow control unit 434, such as a pivoting and rotating ball, may be integrated into the housing 420. The flow control unit 434 mixes the hot and cold water and dispenses the mixed water through the discharge port 432. For example, the flow control unit 434 may be moved such that the flow control unit 434 is selectively positionable to control the amount of water being supplied from each of the passages 36, 38. The flow control unit 434 may be translated or rotated to different positions. In an alternative embodiment, the flow control unit 434 may be another type of flow control device, such as a cartridge type of valve. The flow control unit 434 selectively and adjustably controls the volume and/or temperature of the flow of water by connecting the hot and cold lines 36, 38 to the outlet spout 430. Other types of flow control devices may similarly be used to control the volume and/or temperature of the flow of water to the outlet spout 430.

In an exemplary embodiment, the shut-off valve portion 32 is provided between the hot water inlet port 424 and the flow control unit 434. The shut-off valve portion 32 is operable in an open position allowing water to flow to the hot water outlet and a closed position restricting water from flowing to the hot water outlet. For example, the shut-off valve portion 32 may include a movable shuttle, such as the shuttle 70, or another type of flow limiting device that is configured for permitting and restricting flow. Water flow to the flow control unit 434 may be permitted or restricted based on an operation state of the shut-off valve portion 32. The shut-off valve portion 32 may open or close in a controlled manner to limit discharge of water having a temperature below a desired level. For example, the shut-off valve portion 32 may limit flow until the water is at a desired level.

In an exemplary embodiment, the shut-off valve portion 32 is operable based on a shut-off condition. The shut-off condition may be based on at least one of a temperature of the water, a pressure of the water, a flow rate of the water, a flow volume of the water. The temperature, pressure, flow rate or flow volume may be an absolute amount or a gradient or rate of change in amount of the respective characteristic. The shut-off valve portion 32 may be operated mechanically, such as by an actuator or bias mechanism, or the shut-off valve portion 32 may be operated electrically, such as by a solenoid. In an exemplary embodiment, the shut-off valve portion 32 is operable based on a pressure of the water in the shut-off valve portion 32, and the bypass valve portion 34 is used to control the pressure of the water by permitting and restricting flow of water therethrough.

The bypass portion 34 of the fixture 12 has a bypass passage therethrough and a flow control unit positioned for controlling flow through the bypass passage. The flow control unit may be movable between an open position and a closed position, wherein the flow control unit restricts water flow through the bypass passage in the closed position and permits water flow through the bypass passage in the open position. The bypass valve portion 34 permits recirculating flow from the hot water supply line 36 back to the hot water heater 22 (shown in FIG. 1). In an exemplary embodiment, the bypass valve portion 34 receives water from the hot water supply line 36 through the shut-off valve portion 32 (e.g. water flows through the shut-off valve portion 32 directly into the bypass valve portion 34). The bypass valve portion 34 discharges recirculated water into the cold water supply line 38. In an alternative embodiment, the bypass valve portion 34 discharges recirculated water into a dedicated return line as opposed to the cold water supply line 38.

In an exemplary embodiment, the flow control unit of the bypass valve portion 34 is movable between the open and closed positions based on a bypass condition. The bypass condition may be based on at least one of a temperature of the water, a pressure of the water, a flow rate of the water, a flow volume of the water. The flow control unit may be operated mechanically, such as by an actuator or bias mechanism, or the flow control unit may be operated electrically, such as by a solenoid. Optionally, when the flow control unit is electrically operated between open and closed positions, the operation may be based on an activation signal for an activation source. The activation signal may be responsive to a water characteristic, a timer, a manually activated switch, a push button switch, a motion detector, a photo-detector, a noise detector, an infrared sensor, a door sensor, a floor pressure sensor, or an appliance activation sensor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A valve assembly for a water circulation system, the valve assembly comprising:
    a bypass valve with an inlet and an outlet that permits recirculating flow of water from a hot water line of the water circulation system, the bypass valve being movable between open and closed positions based on a bypass condition, the bypass valve allowing bypass flow in the open position and the bypass valve restricting bypass flow in the closed position; and
    a shut-off valve with a valve body having a hot water inlet and a hot water outlet configured to be coupled to a fixture of the water circulation system, the shut-off valve being located proximate the fixture and operating in an open position allowing water to flow to the hot water outlet and a closed position restricting water from flowing to the hot water outlet, wherein the shut-off valve is movable between the open and closed positions based on a shut-off condition to limit discharge, from the hot water outlet, of water having a temperature below a desired level;
    the bypass valve being movable between the open and closed positions to allow or restrict bypass flow irrespective of the shut off valve being in the open position or being in the closed position.

2. A valve assembly in accordance with claim 1, wherein the shut-off valve is further configured to limit an amount of tepid water that is discharged from the hot water outlet.

3. A valve assembly in accordance with claim 1, wherein the shut-off condition is based on at least one of a temperature of the water, a pressure of the water, a flow rate of the water, a flow volume of the water.

4. A valve assembly in accordance with claim 1, wherein the shut-off valve includes an electrical solenoid for moving the shut-off valve between the open and closed positions, the solenoid being operable in response to the shut-off condition.

5. A valve assembly in accordance with claim 1, wherein the shut-off valve includes a movable shuttle received within the valve body, wherein the movable shuttle permits and restricts water flow to the hot water outlet based on a position of the shuttle.

6. A valve assembly in accordance with claim 1, wherein the shut-off valve includes a movable shuttle received within the valve body, the movable shuttle includes an inner chamber, the shuttle being movable between an open and a closed position based on a pressure differential of the water within the inner chamber and external to the inner chamber.

7. A valve assembly in accordance with claim 1, wherein the shut-off valve includes a movable shuttle received within the valve body, the movable shuttle includes an end wall having a discharge opening extending therethrough, the movable shuttle being movable to the open position when a pressure differential of the water on both sides of the end wall is below a predetermined threshold.

8. A valve assembly in accordance with claim 1, wherein the shut-off valve includes a movable shuttle received within the valve body, the shuttle is movable between an open and a closed position based on a pressure of the water, and wherein the bypass valve is configured to control the pressure of the water by permitting and restricting flow of water therethrough.

9. A valve assembly in accordance with claim 1, wherein the shut-off valve includes a movable shuttle received within the valve body, the movable shuttle includes an inner chamber extending along a longitudinal axis and a discharge passage positioned along a radially outer surface of the shuttle, the discharge passage opening to the inner chamber, wherein water is channeled through the discharge passage to the hot water outlet when the shuttle is in the open position.

10. A valve assembly in accordance with claim 1, wherein the shut-off valve further includes a return spring received within the valve body and configured to move a movable shuttle to an open position based on a pressure of the water.

11. A valve assembly in accordance with claim 1, wherein the bypass valve and the shut-off valve are integrated within a common housing.

12. A valve assembly in accordance with claim 1, wherein the bypass condition is based on at least one of a temperature of the water, a pressure of the water, a flow rate of the water, a flow volume of the water.

13. A valve assembly in accordance with claim 1, wherein the bypass valve includes an electrical solenoid for moving the bypass valve between open and closed positions, the solenoid being operable based on an activation signal responsive to at least one of a water characteristic, a timer, a manually activated switch, a push button switch, a motion detector, a photo-detector, a noise detector, an infrared sensor, a door sensor, a floor pressure sensor, and an appliance activation sensor.

14. A valve assembly for a water circulation system, the valve assembly comprising:
a housing configured to be located proximate a fixture of the water circulation system;
a bypass valve received within the housing, the bypass valve having a bypass passage and a flow control unit movable between an open position and a closed position, wherein the flow control unit is configured to restrict water flow through the bypass passage in the closed position based on a bypass condition and the flow control unit is configured to allow water flow through the bypass passage in the open position based on the bypass condition; and
a shut-off valve received within the housing, the shut-off valve having a hot water inlet and a hot water outlet configured to supply water to the fixture, the shut-off valve operating in an open position allowing water to flow to the hot water outlet and a closed position restricting water from flowing to the hot water outlet, wherein the shut-off valve is movable between the open and closed positions based on a shut-off condition to limit discharge, from the hot water outlet, of water having a temperature below a desired level;
the bypass valve being movable between the open and closed positions irrespective of the shut off valve being in the open position or being in the closed position.

15. A valve assembly in accordance with claim 14, wherein the shut-off valve includes a movable shuttle received within the valve body, wherein the movable shuttle permits and restricts water flow to the hot water outlet based on a position of the shuttle.

16. A valve assembly in accordance with claim 15, wherein the shuttle is movable between an open and a closed position based on a pressure of the water, and wherein the bypass valve is configured to control the pressure of the water by permitting and restricting flow of water therethrough.

17. A valve assembly in accordance with claim 15, wherein the shut-off valve further includes a return spring received within the valve body and configured to move the movable shuttle to an open position based on a pressure of the water.

18. A valve assembly in accordance with claim 14, wherein the bypass condition is based on at least one of a temperature of the water, a pressure of the water, a flow rate of the water, a flow volume of the water.

19. A valve assembly in accordance with claim 1, wherein the bypass valve is movable between the open and closed positions to allow recirculation flow irrespective of the flow of water through the hot water outlet.

20. A valve assembly in accordance with claim 1, wherein the bypass valve includes a cold water inlet configured to be coupled to a cold water line of the water circulation system, the bypass valve allowing recirculating flow from the inlet of the bypass valve to the cold water inlet.

21. A valve assembly for a water circulation system, the valve assembly comprising:
a bypass valve with an inlet and an outlet that permits recirculating flow of water from a hot water line of the water circulation system, the bypass valve being thermally actuated between open and closed positions based on a temperature of the water in the bypass valve; and
a shut-off valve with a valve body having a hot water inlet and a hot water outlet configured to be coupled to a fixture of the water circulation system, the shut-off valve being located proximate the fixture and operating in an open position allowing water to flow to the hot water outlet and a closed position restricting water from flowing to the hot water outlet, wherein the shut-off valve is movable between the open and closed positions based on a shut-off condition to limit discharge, from the hot water outlet, of water having a temperature below a desired level.

22. A valve assembly in accordance with claim 21, wherein the shut-off condition is based on at least one of a temperature of the water, a pressure of the water, a flow rate of the water, a flow volume of the water.

23. A valve assembly in accordance with claim 21, wherein the shut-off valve includes an electrical solenoid for moving the shut-off valve between the open and closed positions, the solenoid being operable in response to the shut-off condition.

24. A valve assembly in accordance with claim 21, wherein the shut-off valve includes a movable shuttle received within the valve body, wherein the movable shuttle permits and restricts water flow to the hot water outlet based on a position of the shuttle.

25. A valve assembly in accordance with claim 21, wherein the shut-off valve includes a movable shuttle received within the valve body, the movable shuttle includes an inner chamber, the shuttle being movable between an open and a closed position based on a pressure differential of the water within the inner chamber and external to the inner chamber.

26. A valve assembly in accordance with claim 21, wherein the shut-off valve includes a movable shuttle received within the valve body, the movable shuttle includes an end wall having a discharge opening extending therethrough, the movable shuttle being movable to the open position when a pressure differential of the water on both sides of the end wall is below a predetermined threshold.

27. A valve assembly in accordance with claim 21, wherein the shut-off valve includes a movable shuttle received within the valve body, the shuttle is movable between an open and a closed position based on a pressure of the water, and wherein the bypass valve is configured to control the pressure of the water by permitting and restricting flow of water therethrough.

28. A valve assembly in accordance with claim 21, wherein the bypass valve includes an electrical solenoid for moving the bypass valve between open and closed positions, the solenoid being operable based on a temperature of the water in the bypass valve.

29. A valve assembly in accordance with claim 21, wherein the bypass valve includes an electrical solenoid for moving the bypass valve between open and closed positions, the solenoid being operable based on an activation signal responsive to at least one of a water characteristic, a timer, a manually activated switch, a push button switch, a motion detector, a photo-detector, a noise detector, an infrared sensor, a door sensor, a floor pressure sensor, and an appliance activation sensor.

\* \* \* \* \*